United States Patent [19]

Triolo et al.

[11] Patent Number: 4,979,097
[45] Date of Patent: Dec. 18, 1990

[54] METHOD AND APPARATUS FOR INTERCONNECTING BUSSES IN A MULTIBUS COMPUTER SYSTEM

[75] Inventors: Victoria M. Triolo, Boylston; Elbert Bloom, Southboro; David W. Hartwell, Boxboro, all of Mass.

[73] Assignee: Digital Equipment Corporation, Maynard, Mass.

[21] Appl. No.: 93,479

[22] Filed: Sep. 4, 1987

[51] Int. Cl.$^5$ .............................................. G06F 13/00
[52] U.S. Cl. ................................. 364/200; 364/228.3; 364/240; 364/240.1; 364/240.2
[58] Field of Search ... 364/200 MS File, 900 MS File

[56] References Cited

U.S. PATENT DOCUMENTS

| | | | |
|---|---|---|---|
| 3,984,814 | 10/1976 | Bailey, Jr. et al. | |
| 4,072,853 | 2/1978 | Barlow et al. | |
| 4,257,099 | 3/1981 | Appelt | 364/200 |
| 4,295,219 | 10/1981 | Draper et al. | |
| 4,377,845 | 3/1983 | Markham et al. | |
| 4,384,322 | 5/1983 | Bruce et al. | |
| 4,404,650 | 9/1983 | Kleinert | 364/900 |
| 4,447,878 | 5/1984 | Kinnie et al. | 364/200 |
| 4,549,296 | 10/1985 | Castel et al. | |
| 4,656,627 | 4/1987 | Hasley et al. | 370/85 |
| 4,661,905 | 4/1987 | Bomba et al. | |
| 4,692,893 | 9/1987 | Casper. | |
| 4,766,536 | 8/1988 | Wilson, Jr. et al. | 364/200 |
| 4,774,422 | 9/1988 | Donaldson et al. | 307/475 |
| 4,787,033 | 11/1988 | Bomba et al. | 364/200 |

FOREIGN PATENT DOCUMENTS 2538140 6/1984 France.
60-150349 8/1985 Japan.

Primary Examiner—Raulfe B. Zache
Attorney, Agent, or Firm—Finnegan, Henderson, Farabow, Garrett, and Dunner

[57] ABSTRACT

A bus adapter connecting a high-speed pended bus to a slower speed non-pended bus includes a first module functioning as a node of the pended bus and a second module functioning as a node of the non-pended bus. An interconnect bus extends between the two modules. Control signals on the interconnect bus generated by the first module comprise status signals having an indefinite assertion duration, and are deasserted only in response to control signals on the interconnect bus generated by the second module, which have a finite duration. Control signals on the interconnect bus generated by the first module are synchronized by a dual-rank synchronizer controlled by two phases of a multiphase clock signal derived from the clock signal of the non-pended bus. Control signals on the interconnect bus generated by the second module are synchronized by a dual-rank synchronizer controlled by two phases of a multiphase clock signal derived from the pended bus clock signal.

14 Claims, 15 Drawing Sheets

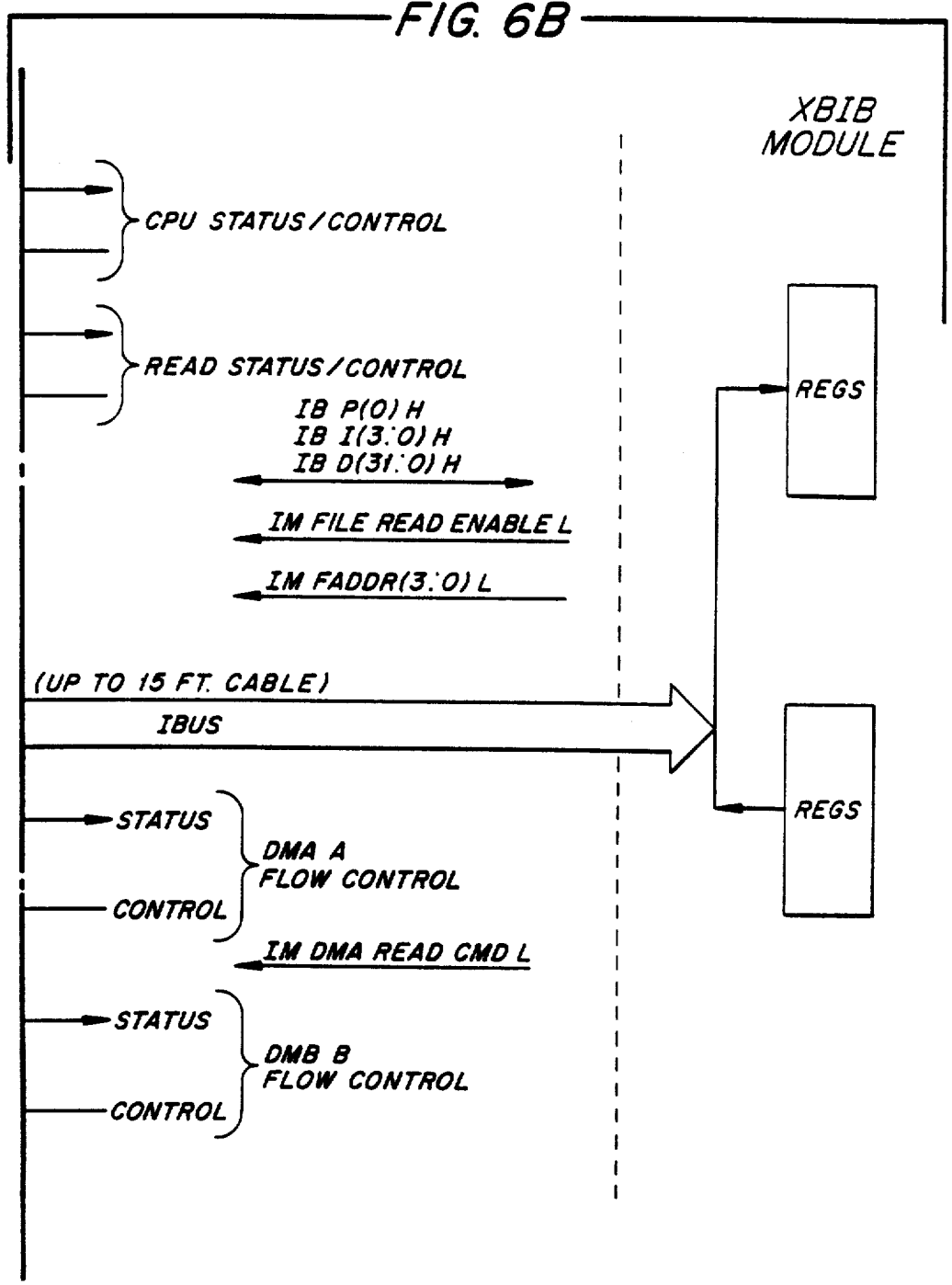

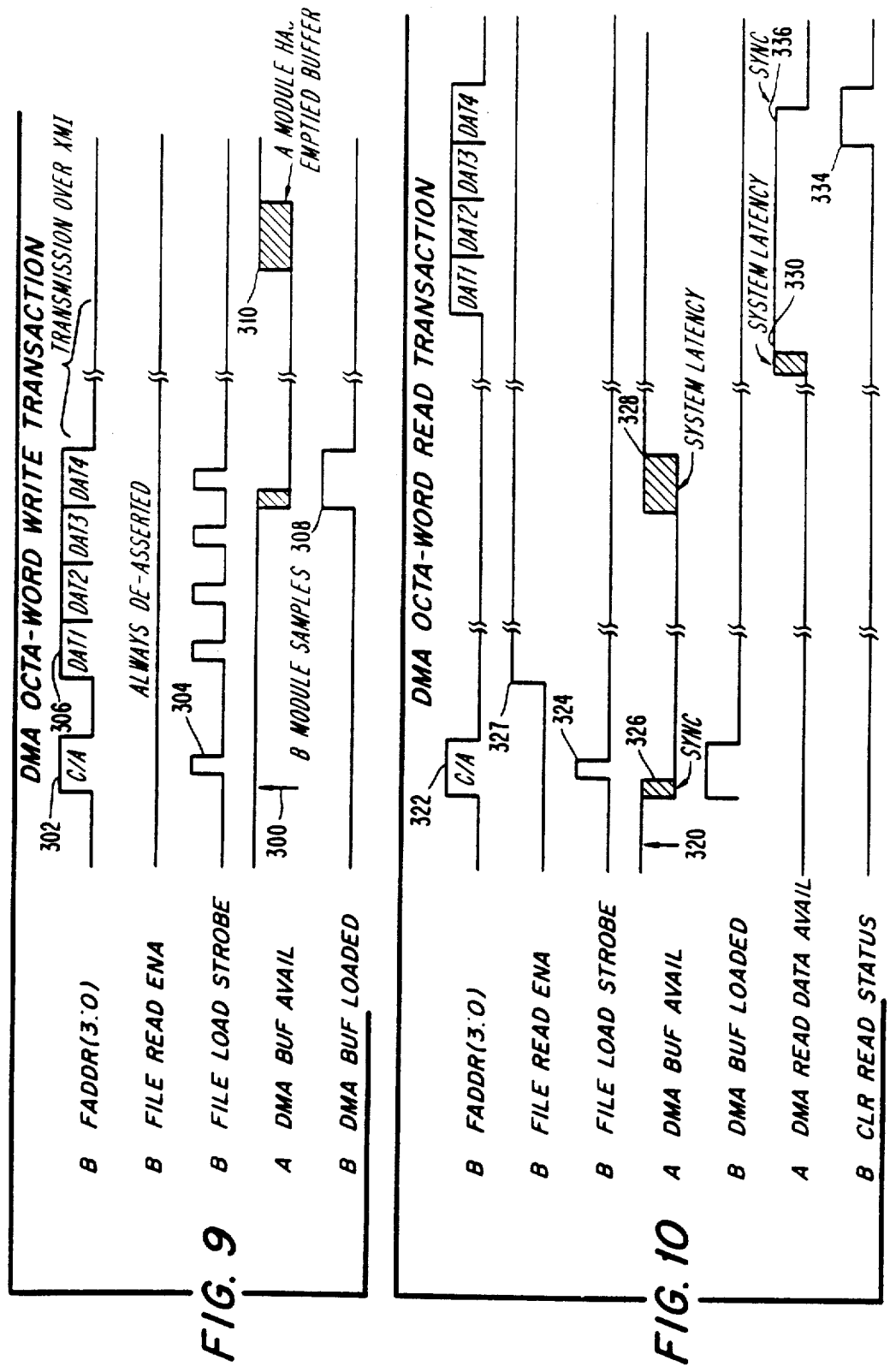

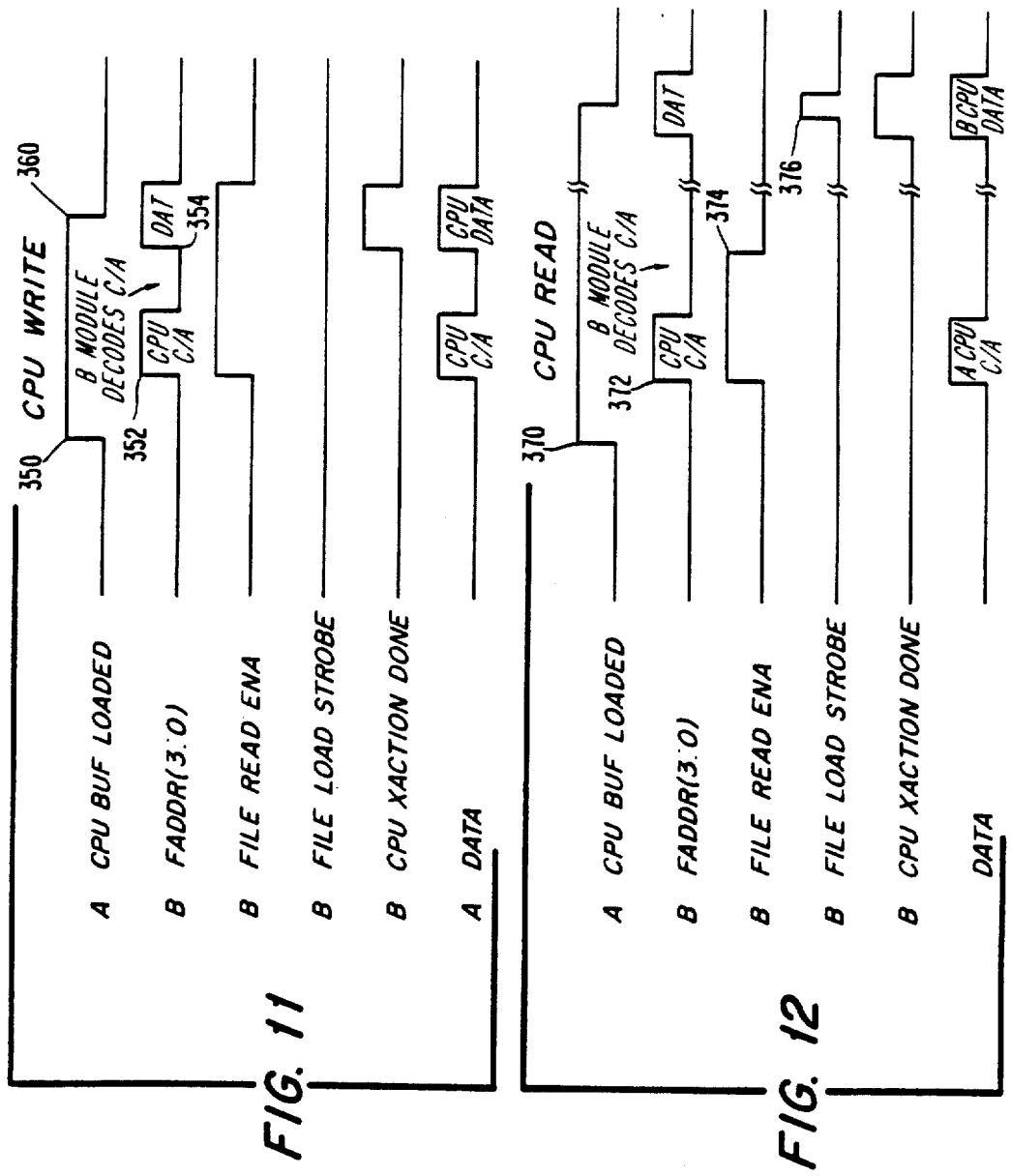

METHOD AND APPARATUS FOR INTERCONNECTING BUSSES IN A MULTIBUS COMPUTER SYSTEM

BACKGROUND OF THE INVENTION

The invention relates to data processing systems and, more particularly, to data processing systems employing multiple busses.

In computers and data processing systems, a bus is commonly employed to interconnect the various elements of the system. For example, a central processing unit is typically connected to memory components, input/output (I/O) devices, etc via a bus capable of carrying the signals associated with the operation of each element These signals include, for example, data signals, clock signals, and other control signals. The bus must be capable of carrying such signals to all components coupled to the bus so that the desired operation can be carried out by the computer system.

As computer systems achieve increasingly higher levels of performance, it is sometimes desirable to provide more than one bus in the computer system For example, it may be desired to provide a high speed main system bus which interconnects processors and high speed memory components, and to provide a separate bus which interconnects I/O devices such as disc drives and tape drives to an I/O controller.

The separate busses in a multibus computer system must be interconnected, which introduces complexities into the system. One method for interconnecting busses is to provide a bus interconnect adapter consisting of first and second adapter modules each connected to one of the busses, and an interconnect bus connecting the two adapter modules. When data is to be transferred from one bus to the other, a transaction is initiated on the one bus, according to a predetermined set of rules, commonly called a protocol. The adapter module connected to the bus on which the transaction is initiated obtains control of the interconnect bus, typically by issuing a "request" signal over the interconnect bus. The other adapter module, if it is not already in control of the interconnect bus, will respond with a "grant" signal. The initiating adapter module gains control of the interconnect bus and begins to generate the signals which constitute the data transfer transaction. This "request/grant" solution is acceptable in many applications, but can result in a limitation on the speed at which data can be transferred between the busses.

In some multibus computer systems, the busses operate with different cycle times. This introduces additional complexity into the problem of transferring data between busses. Such complexity arises because major events on a bus occur in synchronism with clock signals which control the cycle time of the bus, such as a change of state of either the main clock signal or a multiphase clock signal derived from the main clock signal. When data is to be transferred between busses having different cycle times, it is necessary to insure that a control signal generated by circuitry connected to one of the busses will be recognized and acted upon by circuitry connected to the other bus.

In synchronizing transactions between two busses having different cycle times, the transmission of signals from the slow bus to the fast bus is relatively straightforward. That is, a control signal operated in accordance with the cycle time of the slow bus will remain in its asserted state over at least one complete cycle of the faster bus, thus ensuring that the signal in its asserted condition is captured and recognized by the faster bus.

Transmitting a signal from the fast bus to the slow bus, however, is more difficult. This is because a signal which is asserted only for the duration of one bus cycle on the fast bus may return to its deasserted condition before the clock on the slow bus transitions from one state to another. Since incoming control signals will only be synchronized, that is, recognized, upon the occurrence of a change of state in a clock signal on the slow bus, it is possible for a control signal of finite duration generated by the fast bus to fail to be recognized by the slow bus.

Various techniques are known for addressing this problem. For example, a control signal generated by the fast bus can be passed through a multistage counter circuit, prior to sending it to the slow bus, to "stretch" the assertion time of the control signal over a period of several fast bus clock cycles, the stretched control signal having an assertion time greater than the cycle time of the slow bus. This method has the disadvantage of requiring relatively complex logic to generate the control signals, a particularly undesirable characteristic where many control signals must be generated. Moreover, if the assertion time of the control signal is only marginally longer than the cycle time of the slow bus, circuitry associated with the slow bus may have only one chance to detect the control signal before it returns to its deasserted condition. If noise is present on the system, noise may prevent the slow bus from recognizing the single change of state of the control signal, thus resulting in lower system reliability.

Another known method of transmitting control signals from a fast bus to a slow bus is to utilize the incoming control signal on the slow bus side to control the clock terminal of synchronizing circuitry, thus resulting in an edge-triggered control signal receiving circuit. A control signal generated by the fast bus having a duration equal to the cycle time of the fast bus will, if all goes well, result in receipt of the control signal on the slow bus side. As with the "stretch" method described above, however, the slow bus circuitry may have only one chance to detect the incoming control signal before it returns to its deasserted condition, rendering the system susceptible to noise. Moreover, an incoming control signal having a clean edge is needed to accurately operate edge-triggered receiving circuitry. Thus, systems employing edge-triggered circuitry require careful attention to design to insure good electrical integrity of the generated signals. Such critical design requirements increase the cost of the system.

Thus, none of the known methods of transmitting control signals from a fast bus to a slow bus in a multibus computer system are completely satisfactory.

II. SUMMARY OF THE INVENTION

It is an object of the present invention to provide a method and apparatus for connecting busses in a multibus computer system that reduces the number of clock signals required for a transaction tranferring data between the busses.

Another object of the invention is to provide a method and apparatus for interconnecting busses of a multibus computer system in which the busses have different cycle times.

Yet another object of the invention is to provide a method and apparatus for interconnecting busses of a multibus computer system in which transactions can be initiated from either bus.

Still a further object of the invention is to provide a method and apparatus for interconnecting busses of a multibus computer system in which one of the system busses is a pended bus and the other is a non-pended bus.

Additional objects and advantages of the invention will be set forth in part in the description which follows and, in part, will be obvious from the description or may be learned by practice of the invention. The objects and advantages of the invention will be realized and attained by means of the instrumentalities and combinations particularly pointed out in the appended claims.

To achieve the objects and in accordance with the purpose of the invention, as embodied and broadly described herein, the invention comprises a bus adapter for providing an information path between first and second busses in a computer system, the first and second busses each propagating data during repetitive bus cycles respectively controlled by first and second clock signals, the first bus having a cycle time faster than the second bus. The adapter comprises an interconnect bus and a first adapter module which includes a first interconnect interface circuit connected to the interconnect bus, a first bus interface circuit adapted for connection to the first bus, and a buffer for storing data to be transferred from the second bus to the first bus. The first adapter module further includes first control means for asserting a BUFFER AVAILABLE signal on the interconnect bus when the buffer is capable of receiving data, for deasserting the BUFFER AVAILABLE signal only in response to a BUFFER LOADED signal received over the interconnect bus, and for activating the first bus interface circuit to transmit data from the buffer to the first bus in response to the BUFFER LOADED signal. The adapter further comprises a second adapter module comprising a second interconnect interface circuit connected to the interconnect bus, a second bus interface circuit adapted for connection to the second bus, and second control means for initiating transactions which transfer data between the first and second busses over the interconnect bus in response to signals received over the second bus, the transactions requiring transmission of a predetermined amount of data from the second adapter module to the first adapter module. The second control means comprises means for transmitting data from the second adapter module to the first adapter module over the interconnect bus only when the BUFFER AVAILABLE signal is asserted and means for generating a BUFFER LOADED signal when the predetermined amount of data has been transmitted to the first adapter module.

The accompanying drawings which are incorporated in and constitute a part of the specification, illustrate one embodiment of the invention and, together with the description, serve to explain the principles of the invention.

BRIEF DESCRIPTION OF THE DRAWINGS

FIG. 6A and 6B are schematic diagrams showing the relationship between the receive and transmit register files of FIGS. 7 and 8 and the interconnect bus signals shown in FIG. 4;

FIG. 9 is a representative timing diagram showing signals generated by the control and sequencer logic circuit of FIG. 2 during WRITE transactions initiated from the I/O bus shown in FIG. 1;

FIG. 10 is a representative timing diagram showing signals generated by the control and sequencer logic circuit of FIG. 2 during READ transactions initiated from the I/O bus shown in FIG. 1;

FIG. 11 is a representative timing diagram showing signals generated by the control and sequencer logic circuit of FIG. 2 during WRITE transactions initiated by the system bus shown in FIG. 1;

FIG. 12 is a representative timing diagram showing signals generated by the control and sequencer logic circuit of FIG. 2 during READ transactions initiated by the system bus shown in FIG. 1;

IV. DETAILED DESCRIPTION OF THE PREFERRED EMBODIMENT

Figure 1:
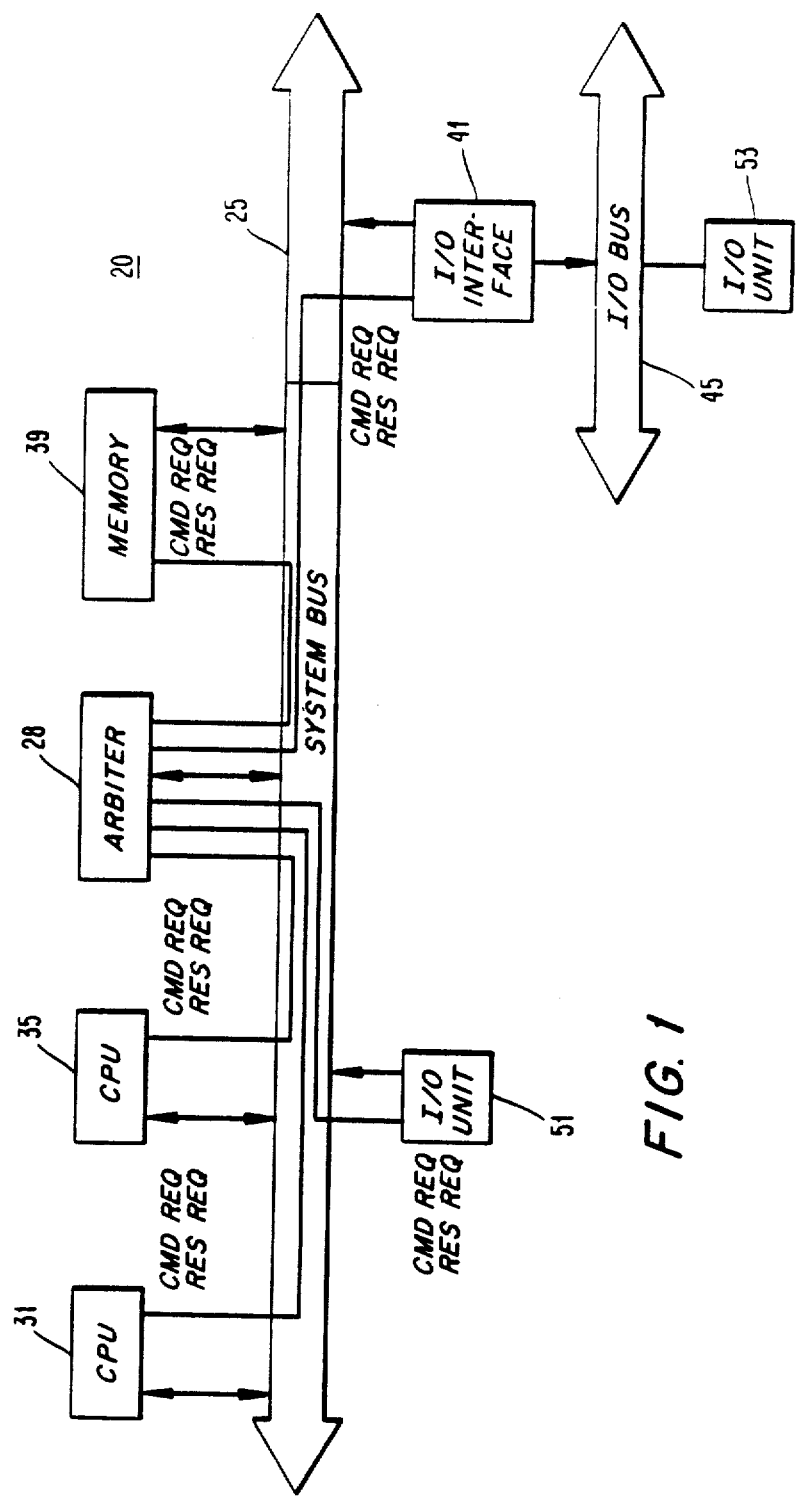
FIG. 1 is a block diagram of a data processing system including a plurality of busses and embodying the present invention.

Reference will now be made in detail to the presently preferred embodiment of the invention, an example of which is illustrated in the accompanying drawings. Throughout the drawings, like reference characters are used to indicate like elements.

FIG. 1 shows an example of a data processing system 20 which embodies the present invention System 20 includes a system bus 25 which is a synchronous bus that allows communication between several processors, memory subsystems, and I/O systems. Communications over system bus 25 occur synchronously using periodic bus cycles.

In FIG. 1, system bus 25 is coupled to two processors 31 and 35, a memory 39, one I/O interface 41, and one I/O unit 51. I/O unit 53 is coupled to system bus 25 by way of an I/O bus 45 and I/O interface 41, which constitutes a bus adapter Although only one I/O unit 53 is connected to I/O bus 45 in FIG. 1, a plurality of devices, such as I/O controllers, memory modules, and processors, may be connected to I/O bus 45.

Both system bus 25 and I/O bus 45 propagate data during repetitive bus cycles respectively controlled by system bus clock signals and I/O bus clock signals. In the preferred embodiment, system bus 25 is a 64-bit pended bus having a cycle time of 64 ns. and I/O bus 45 is a 32-bit non-pended bus having a cycle time of 200 ns. The protocol for initiating transactions on system bus 25 is described more completely in U.S. patent application Ser. No. 07/044,952, entitled METHOD AND APPARATUS FOR ASSURING ADEQUATE ACCESS TO SYSTEM RESOURCES BY PROCESSORS IN A MULTIPROCESSOR COMPUTER SYSTEM, filed May 1, 1987 by Richard B. Gillett, Jr. and Douglas D. Williams, and assigned to the assignee of this invention. The protocol for transactions initiated on I/O bus 45 is described more completely in U.S. Pat. No. 4,661,905 issued Apr. 28, 1987 to Frank C. Bomba, et al. and assigned to the assignee of this invention. The disclosures of the aforementioned application and patent are hereby expressly incorporated herein by reference.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O interface unit 41 may constitute a device controller and I/O bus 45 may constitute a bus connecting the device controller to an I/O device, such as a magnetic disk drive unit.

In the nomenclature used to describe the present invention, processors 31 and 35, memory 39, bus adapter 41, and I/O devices 51 and 53 are all called nodes. A "node" is defined as a hardware device which connects to a bus.

According to the nomenclature used to describe the present invention, the terms "signals" or "lines" are used interchangeably to refer to the names of the physical wires. The terms "data" or "levels" are used to refer to the values which the signals or lines can assume.

Nodes perform transfers with other nodes over system bus 25. A "transfer" is one or more contiguous cycles that share a common transmitter and common arbitration. For example, a READ operation initiated by one node to obtain information from another node on system bus 25 requires a command transfer from the first to the second node followed by one or more return data transfers from the second node to the first node at some later time.

A "transaction" is defined as the complete logical task being performed on a bus and can include more than one transfer. For example, a READ operation consisting of a command transfer followed later by one or more return data transfers is one transaction. A transaction may also be initiated from a node on one bus to a node on another bus.

In the preferred embodiment of system bus 25, the permissible transactions support the transfer of different data lengths and include READ, WRITE (masked), interlock READ, unlock WRITE, and interrupt operations. The difference between an interlock READ and a regular or noninterlock READ is that an interlock READ to a specific location retrieves information stored at that location and restricts access to the stored information by subsequent interlock READ commands. Access restriction is performed by setting a lock mechanism. A subsequent unlock WRITE command stores information in the specified location and restores access by other nodes to the stored information by resetting the lock mechanism at that location. Thus, the interlock READ/unlock WRITE operations are a form of READ-MODIFY-WRITE operations.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with nonpended I/O bus 45 in which the bus is tied up for an entire transaction. For example in system bus 25, after a node initiates a READ transaction and makes a command transfer, the node to which that command transfer is directed may not be able to return the requested data immediately. Cycles on bus 25 would then be available between the command transfer and the return data transfer of the READ transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a WRITE or READ operation, the commander is the node that requested the WRITE or READ operation; it is not necessarily the node that sends or receives the data. In the preferred protocol for system bus 25, a node remains as the commander throughout an entire transaction even though another node may take ownership of system bus 25 during certain cycles of the transaction. For example, although one node has control of system bus 25 during the transfer of data in response to the command transfer of a READ transaction, Instead, this node is called a "responder."

A responder responds to the commander. For example, if a commander initiated a WRITE operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a READ transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The commander request lines and responder request lines are considered to be arbitration signals. As illustrated in FIG. 1, arbitration signals also include point-to-point conditional grant signals from central arbiter 28 to each node, system bus extend signals to implement multiple bus cycle transfers, and system bus suppression signals to control the initiation of new bus transactions when, for example, a node like a memory is momentarily unable to keep up with traffic on system bus 25.

Other types of signals which can constitute system bus 25 include information transfer signals, respond signals, control signals, console/front panel signals, and a few miscellaneous function signals which represent the function being performed on the system bus during a current cycle, identifier signals identifying the commander, and parity signals. The respond signals generally include acknowledge or confirmation signals from a receiver to notify the transmitter of the status of the data transfer.

Control signals on system bus 25 include clock signals, warning signals, such as those identifying low line voltages or low DC voltages, reset signals used during initialization, node failure signals, default signals used during idle bus cycles, and error signals. The console/front panel signals include signals to transmit and receive serial data to a system console, boot signals to control the behavior of a boot processor during power-up, signals to enable modification of the erasable PROM of processors on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
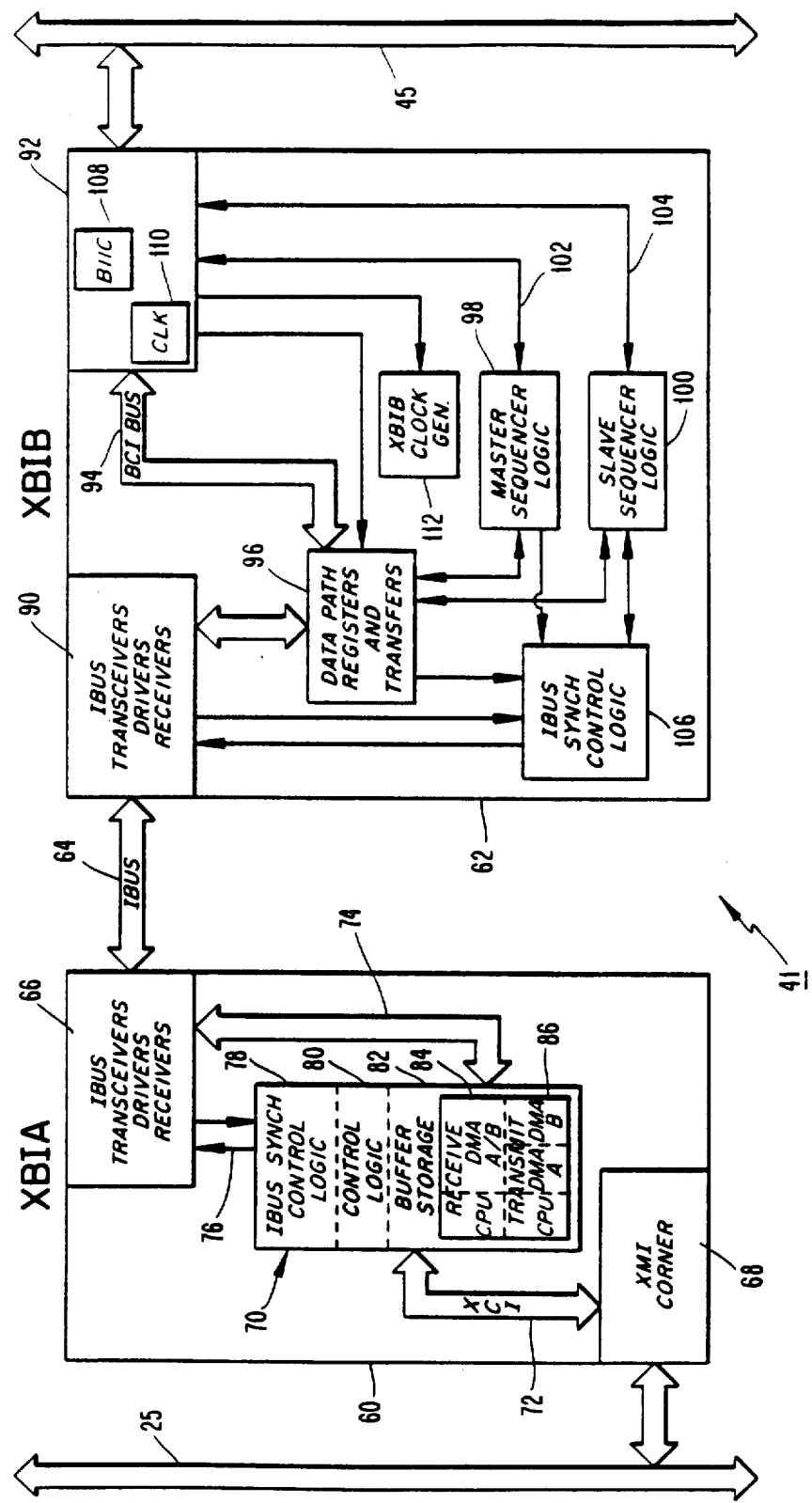
FIG. 2 is a block diagram of a bus adapter, functioning as an I/O interface shown in FIG. 1 and embodying the present invention.

FIG. 2 shows bus adapter 41 in greater detail. Bus adapter 41 provides an information path between system bus 25 and I/O bus 45 by functioning as a node on each bus. Transactions over bus adapter 41 can be initiated either by system bus 25 or by I/O bus 45. System bus-initiated transactions will hereinafter be referred to as CPU transactions, and I/O bus-initiated transactions will be referred to as DMA transactions.

Bus adapter 41 includes a first adapter module 60 and a second adapter module 62 interconnected by an interconnect bus 64, hereinafter called IBUS 64. IBUS 64 includes four command lines I(3:0), thirty-two data lines D(31:0), a parity line P(0), four address lines FADDR(3:0), and a plurality of control lines to be described below in greater detail. In the above notation, the numbers in parentheses respectively represent the high and low ending bit numbers of the bus field indicated by the capital letter. For example, D(31:0) represents a thirty-two bit data field extending from low order bit number 0 to high order bit number 31.

Physically, first and second adapter modules 60 and 62 consist of printed circuit cards each inserted into cabinets respectively containing system components connected to system bus 25 and I/O bus 45. IBUS 64 consists of four cables connected at each end to one of the first and second adapter modules 60 and 62.

First adapter module 60, hereinafter referred to as XBIA module 60, includes a first interconnect interface circuit 66 connected to the IBUS 64 and a first bus interface circuit 68 adapted for connection to system bus 25. Interconnect interface circuit 66 includes a plurality of bus transceiver circuits for sending and receiving signals from IBUS 64, and will be described below in greater detail. Bus interface circuit 68 is described in greater detail in the aforementioned U.S. patent application Ser. No. 07/044,952.

XBIA module 60 also includes a large scale integration (LSI) gate array circuit 70 connected to bus interface circuit 68 by a node bus 72, and to interconnect interface circuit 66 by a module data bus 74 and a module control bus 76. Gate array 70 includes a synchronization logic circuit 78, a node control logic circuit 80, and a buffer storage area 82. Buffer storage area 82 includes a receive register file 84 and a transmit register file 86.

Second adapter module 62, hereinafter referred to as XBIB module 62, includes a second interconnect interface circuit 90 connected to IBUS 64 and a second bus interface circuit 92. Interconnect interface circuit 90 includes a plurality of bus transceiver circuits to send and receive signals over IBUS 64. Second bus interface circuit 92 is connected to a data bus 94, hereinafter referred to as a BCI bus. BCI bus 94 is connected through a register and transfer circuit 96 to second interconnect interface circuit 90. BCI bus 94 includes parity, command, and data lines buffered from corresponding parity, command, and data lines of I/O bus 45. Register and transfer circuit 96 consists of a buffered data path implemented within a gate array for transfer of data between data bus 94 and second interconnect interface circuit 90.

XBIB module 62 also includes master sequencer logic circuit 98 and slave sequencer logic circuit 100 which are used to control transactions transferring data between system bus 25 and I/O bus 45. Master and slave sequencer logic circuits 98 and 100 are connected to bus interface circuit 92 by control BCI lines indicated at 102 and 104, respectively. Master and slave sequencer logic circuits 98 and 100 are also connected to a synchronization logic circuit 106, which is in turn connected to interconnect interface circuit 90.

Bus interface circuit 92 includes a bus interface integrated circuit 108, hereinafter referred to as a BIIC circuit. BIIC circuit 108 includes transceiver circuits directly connected to I/O bus 45 as well as appropriate control logic. BIIC circuit 108 is described more completely in the aforementioned U.S. Pat. No. 4,614,905 and in U.S. Pat. No. 4,661,882 issued Sept. 30, 1986 to Wayne C. Parker and John W. May, and assigned to the assignee of this invention. The disclosure of U.S. Pat. No. 4,661,882 is hereby expressly incorporated herein by reference.

Bus interface circuit 92 also includes a clock logic circuit 110. Clock logic circuit 110 includes an oscillator and appropriate circuitry for generating a clock signal which controls bus cycles on I/O bus 45. Alternatively, another node connected to I/O bus 45 could generate the master clock signal for control of I/O bus 45, in which case clock logic circuit 110 would derive a local clock signal under control of the I/O master clock signal received from I/O bus 45. In the preferred embodiment, the I/O bus clock signal establishes a 200 ns. bus cycle time on I/O bus 45.

XBIB clock generation circuit 112 which generates a four-phase clock signal T0, T50, T100, and T150 from the I/O bus clock signal, each phase of the multiphase clock signal having a duration of 50 ns. Multiphase clock signals T0-T150 are shown in FIG. 3B.

The essential function of bus adapter 41 is to permit nodes connected to system bus 25 to initiate transactions to transfer data to or from nodes attached to I/O bus 45 and to permit nodes attached to I/O bus 45 to initiate transactions to transfer data to or from nodes attached to system bus 25. In each case, a transaction initiated from a node on one bus to transfer data to or from a node on another bus is instituted in exactly the same way as all other transactions on the initiating bus, using the appropriate bus protocol.

The general operation of bus adapter 41 will now be described with reference to FIG. 2. A transaction initiated on I/O bus 45 to transfer data to or from a node connected to system bus 25 will result in command/address information being received by BIIC 108 and transferred over BCI bus 94 to data. path register and transfer circuit 96. A control line BCI CLE (FIGS. 13A and 13B) of lines 104 is asserted by BIIC 108 to indicate that a transaction is available on I/O bus 45.

A transaction is initiated over IBUS 64 such that if appropriate status signals from XBIA module 60 are asserted (in a manner to be described in greater detail below), interconnect interface circuit 90 writes the command/address information over IBUS 64 through interconnect interface circuit 66 for storage in register file 86 of buffer storage area 82.

Transactions initiated over IBUS 64 require transmission of a predetermined amount of data from XBIB module 62 to XBIA module 60. For example, if a node connected to I/O bus 45 desires to write four words of data to a node connected to system bus 25, a total of five words must be transmitted from XBIB module 62 to XBIA module 60: a command/address word, and four data words. Since a transaction, requiring information to be transmitted from XBIA module 60 to system bus 25, the appropriate command/address and data words are transferred, one word at a time, and written into either DMA-A or DMA-B buffers of register file 86, depending on which DMA buffer is free. Upon transfer of the last of the four data words, XBIB module 62 generates a control signal to XBIA module 60 (to be described below in greater detail), causing control logic 80 of XBIA module 60 to initiate a WRITE transaction transmitting command/address and data words through bus interface circuit 68 onto system bus 25.

If a node attached to I/O bus 45 desires to read data stored in a node attached to system bus 25, the node initiates a DMA READ transaction on I/O bus 45 consisting of a single command/address word which is transferred from I/O bus 45 through XBIB module 62 and XBIA module 60 to system bus 25 for delivery to the appropriate node on system bus 25. Since I/O bus 45 is a non-pended bus while system bus 25 is a pended bus, I/O bus 45 is tied up until such time as the requested data is transferred from the designated system bus node over system bus 25, XBIA module 60, IBUS 64, and XBIB module 62 to I/O bus 45.

System bus 25, on the other hand, is a pended bus, which means that other transactions can occur over system bus 25 while the node designated in the READ transaction is obtaining the desired data. When the node is ready to transmit the data back from system bus 25 to the requesting node on I/O bus 45, such node initiates a response transaction on system bus 25, in the manner described more completely in the aforementioned U.S. patent application Ser. No. 07/044,952, causing appropriate data to be stored in the DMA receive buffer of receive register file 84 in XBIA module 60. Control logic 80 causes appropriate control signals to be asserted over IBUS 64 to XBIB module 62. Slave sequencer 100 generates appropriate control signals through second interconnect interface circuit 90, IBUS 64, and first interconnect interface circuit 66 to read the data stored in the DMA receive register file 84, converted into a format compatible with I/O bus 45, back over IBUS 64 to data path register and transfer circuit 96 for transmission through bus interface circuit 92 onto I/O bus 45.

Figure 3A:
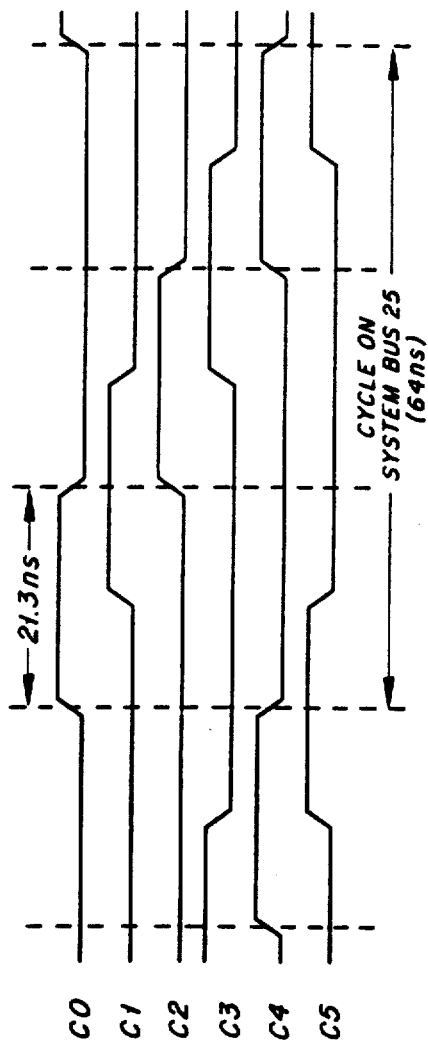
FIGS. 3A and 3B are timing diagrams showing clock signals in the bus adapter of FIG. 2.
Figure 3B:
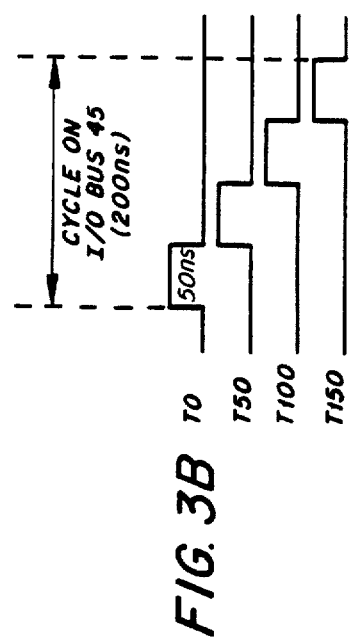

FIGS. 3A and 3B show clock signals respectively generated by XBIA module 60 and XBIB module 62. As can be seen in FIG. 3A, XBIA module 60- generates six clock signal phases C0–C5 each having a 21.3 ns. assertion time. These phases are derived from master clock signals carried by system bus 25 which establish a cycle time of 64 ns. for system bus 25. Similarly, FIG. 3B shows four clock signal phases each having a period of 50 ns. The phases shown in FIG. 3B are derived from master clock signals carried by I/O bus 45 which establish a cycle time of 200 ns. for I/O bus 45.

Figure 4:
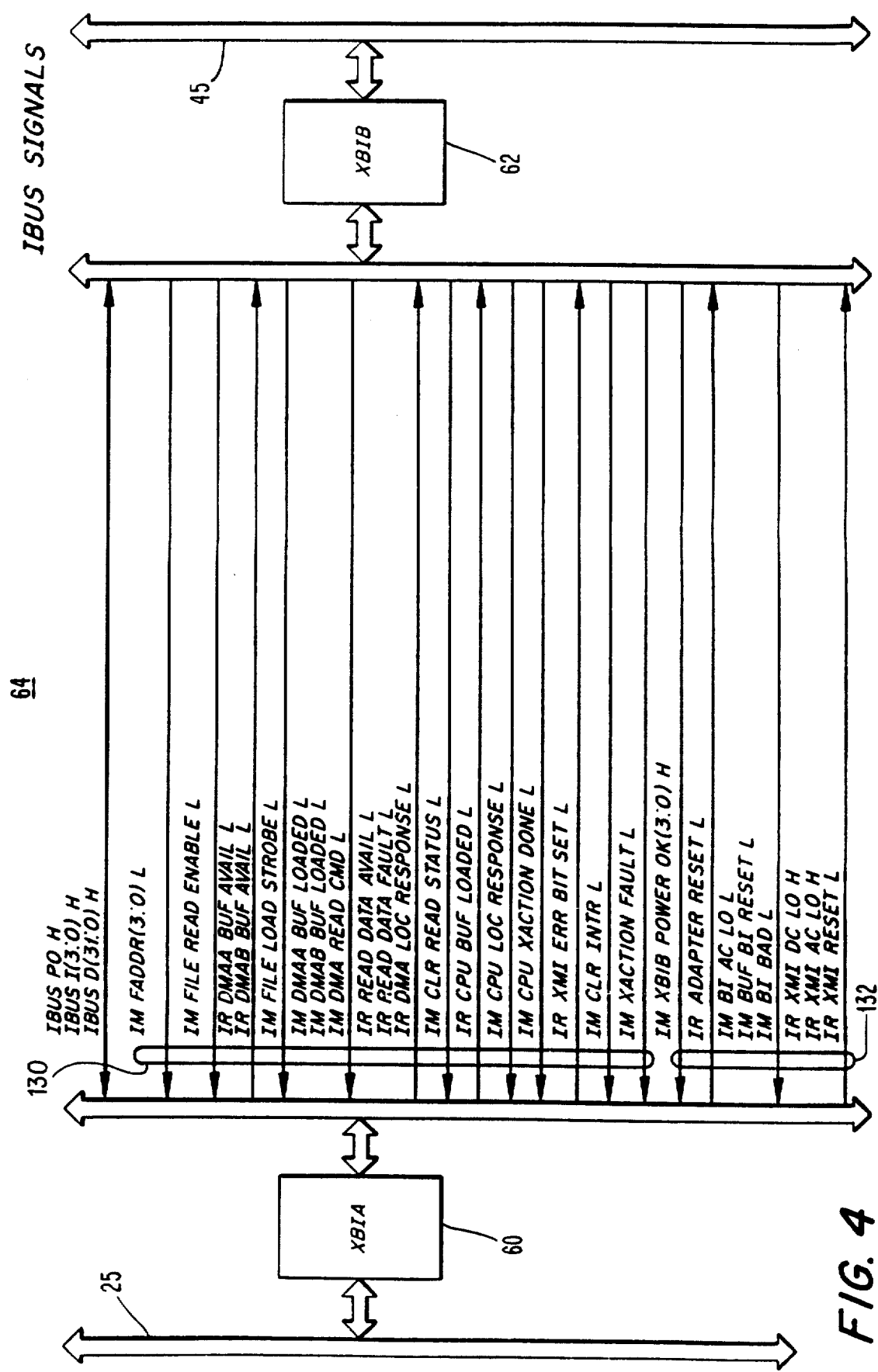
FIG. 4 is a block diagram of the bus adapter of FIG. 2 showing the signals carried by the interconnect bus.

FIG. 4 shows the signals which constitute IBUS 64. As shown therein, IBUS 64 includes a data path having a plurality of data signals represented by I(3:0) and D(31:0) and P(0). Interconnect bus 64 also includes a first control path having a plurality of first control signals related to control of the data signals. In the preferred embodiment, the first control signals are indicated in FIG. 4 at 130. The IBUS 64 further includes a second control path having a plurality of second control signals not related to control of the data path. In a preferred embodiment, the second control signals are indicated at 132 in FIG. 4. Signals constituting IBUS 64 are more completely described below.

---

IBUS BI-DIRECTIONAL SIGNALS

* IB D (31:00) (IBUS Data Field) -
   The IB D(31:0) field is used for the transfer of addresses and data to and from register files 84 and 86. The field is directly mapped to the BCI D(31:0) field of BIIC 108.
   This field is asserted for 200 ns when the contents of register files 84 and 86 are read or written under the control of module 62.

* IB I(3:0) (IBUS Instruction Field) -
   The IB I(3:0) field is used for the transfer of Commands, Read status codes, and Write masks to and from the register files 84 and 86. The field is directly mapped to the BCI I(3:0) field of BIIC 108.
   This field is asserted for 200 ns when the contents of the register files 84 and 86 are read or written under the control of the module 62.

* IB P0 (IBUS Parity) -
   IB P(0) is the parity bit for the IB D(31:0) and IB I(3:0) fields. The bit is directly mapped to the BCI Parity bit of the BIIC 92. Parity is odd.
   This field is asserted for 200 ns when the contents of the register files 84 and 86 are read and written under the control of the XBIB module.

XBIB TO XBIA CONTROL SIGNALS

* IM FADDR(3:0) L (Reg File Address Field) -
   The IM FADDR(3:0) L field is used by the XBIB Module to address any one of 16 possible locations in the register files 84 and 86 (as seen from the IBUS side).
   This field is asserted for 200 ns when the contents of the register files 84 and 86 are read or written under the control of the XBIB module.

-continued

| | (AS SEEN ON THE IBUS) | |
|---|---|---|
| FADDR | LOCATION | READ/WRITE STATUS |
| 1111 | CPU CMD/ADDR | READ ONLY |
| 1110 | CPU DATA/MSK | READ/WRITE |
| 1101 | RESERVED | N/A |
| 1100 | DMA-A CMD/ADDR | WRITE ONLY |
| 1011 | DMA-A DATA/MSK 0 | READ/WRITE |
| 1010 | DMA-A DATA/MSK 1 | READ/WRITE |
| 1001 | DMA-A DATA/MSK 2 | READ/WRITE |
| 1000 | DMA-A DATA/MSK 3 | READ/WRITE |
| 0111 | RESERVED | N/A |
| 0110 | RESERVED | N/A |
| 0101 | RESERVED | N/A |
| 0100 | DMA-B CMD/ADDR | WRITE ONLY |
| 0011 | DMA-B DATA/MSK 0 | WRITE ONLY |
| 0010 | DMA-B DATA/MSK 1 | WRITE ONLY |
| 0001 | DMA-B DATA/MSK 2 | WRITE ONLY |
| 0000 | DMA-B DATA/MSK 3 | WRITE ONLY |

NOTE

There can only be one DMA Read Transaction pending at a time. DMA Read Return data will always be loaded into the DMA-A Receive Buffer, regardless of which DMA Transmit buffer was initially used to transmit the "Read" command. Therefore, there is no need to have a DMA-B Receive Buffer. This is why the DMA-B Buffer in the above chart is classified as "Write Only".

* IM FILE LOAD STROBE L -

IM FILE LOAD STROBE L causes the data currently asserted on IB D(31:0), IB I(3:0) and IB P0 to be loaded into the register files 86 at the address specified by the address lines, IM FADDR(3:0) L.

The XBIB Module asserts IM FILE LOAD STROBE L 50 ns after asserting IB D(31:0), IB I(3:0), IB P0 and IM FADDR(3:0)L.

The XBIB Module deasserts IM FILE LOAD STROBE L 50 ns before deasserting IB D(31:0), IB I(3:0), IB P0 and IM FADDR(3:0)L.

* IM FILE READ ENABLE L -

IM FILE READ ENABLE L, when asserted, causes the contents of the register files 84 at the address specified by the address lines, IM FADDR(3:0)L to be asserted onto IB D(31:0), IB I(3:0) and IB P0 of the IBUS.

The XBIB Module asserts IM FILE READ ENABLE L for at least 200 ns when it is reading the contents of a location in the register file.

* IM DMA READ CMD L -

IM DMA READ CMD L is used by the XBIA to determine if a DMA I/O bus to system bus READ transaction is in progress when the XBIA detects an IBUS parity error during the time that the XBIB is loading the I/O bus command/address data. This information will be used by the XBIA to determine if it is necessary to issue a system crash transaction on system bus 25. If this signal is asserted, and an IBUS parity error is detected by the XBIA and XBIA 60 decodes a READ command on lines I(3:0), the XBIA should abort this trasaction and issue IR READ DATA FAULT L to the XBIB.

* IM CPU XACTION DONE L -

IM CPU XACTION DONE L indicates that a CPU Command has been processed by the XBIB Module and the CPU Transaction may now be completed by the XBIA Module.

The XBIB Module asserts IM CPU XACTION DONE L for 200 ns when it has completed processing a CPU Command over the IBUS Interface. If the command was a WRITE, (does not require additional Transfers to complete) the XBIA module will release the CPU Buffer for further transactions. If the Command was a "Read" (requires an additional Transfer for returning data to the commander) the XBIA will complete the return data transfer and then release the CPU Buffer for further transactions.

* IM CPU LOC RESPONSE L -

IM CPU LOC RESPONSE L indicates that an INTERLOCKED READ CPU Command that has been issued onto the I/O bus was unable to complete due to the resource being locked on the I/O bus.

The XBIB Module asserts IM CPU LOC RESPONSE L for 200 ns along with IM CPU XACTION DONE L when it is unable to complete the requested transaction due to a locked resource on the I/O bus. The XBIA module will release the CPU Buffer for further transactions, and will issue the LOC response onto the system bus

* IM DMAA BUF LOADED L -

IM DMAA BUF LOADED L indicates that the XBIB Module has loaded a command/data (if applicable) over the IBUS into the DMA-A Buffer. The XBIB Module asserts IM DMAA BUF LOADED L for 200 ns. When the XBIA Module senses IM DMAA BUF LOADED L it will process the transaction over system bus 25.

-continued

If the DMA transaction was a Write, no status is returned to the XBIB and the transaction is completed by the XBIA.

If the DMA transaction was a Read (I.E., IR READ DATA AVAIL L, IR DMA LOC RESPONSE L, IR READ DATA FAULT L), Read status is returned to the XBIB Module.

* IM DMAB BUF LOADED L -

IM DMAB BUF LOADED L indicates that the XBIB Module has loaded a command/data (if applicable) over the IBUS into the DMA-B Buffer. The XBIB Module asserts IM DMAB BUF LOADED L for 200 ns. When the XBIA Module senses IM DMAB BUF LOADED L it will process the transaction over the bus adapter interface 68.

If the DMA transaction was a Write, no status is returned to the XBIB and the transaction is completed by the XBIA.

If the DMA transaction was a Read, Read status is returned to the XBIB Module (I.E., IR READ DATA AVAIL L, IR DMA LOC RESPONSE L, IR READ DATA FAULT L).

* IM CLR READ STATUS L -

The XBIB Module asserts IM CLR READ STATUS L for 200 ns when it has completed processing DMA Read Status information and, therefore, wants to clear the XBIA Module's DMA Read Status Flags.

The assertion of IM CLR READ STATUS L by the XBIB Module causes the XBIA Module to clear IR READ DATA FAULT L, IR DMA LOC RESPONSE L and IR READ DATA AVAIL L.

* IM XACTION FAULT L -

The XBIB Module asserts IM XACTION FAULT L for 200 ns along with IM CPU XACTION DONE L whenever it detects an error on a CPU Transaction. If the XBIA's corresponding "CPU READ CMD" flag is set the XBIA will issue an RER Response to the XMI. If the XBIA's "CPU READ CMD" flag is not set, the XBIA will terminate the transaction and issue an IVINTR transaction with MEM WRITE ERROR set in the type field.

The XBIB Module asserts IM XACTION FAULT L for 200 ns along with IM DMAA BUF LOADED L or IM DMAB BUF LOADED L whenever it detects an error on a DMA Transaction. The XBIA will respond by ignoring any errors it may have detected during the loading of its DMA Buffer, aborting the pending transaction, and releasing the DMA Buffer for subsequent transactions.

* IM CLR INTR L -

The XBIB asserts IM CLR INTR L for 200 ns whenever IR XBIA ERR BIT SET L is asserted, and the XBIB decodes a system bus IDENT command with the IDENT LEVEL field having bit 19 set.

When the XBIA module receives IM CLR INTR L it will clear the assertion of IR XBIA ERR BIT SET L, within 200 ns or less.

* IM BI BAD L -

IM BI BAD L is used for reporting node failures on the I/O bus. It is directly mapped from the signal "BI BAD L" from the I/O bus.

The assertion of BI BAD L will cause the assertion of XMI BAD L.

* IM XBIB POWER OK (3:0) H -

IM XBIB POWER OK (3:0) H indicates to the XBIA Module that the XBIB Module is powered on and should be capable of correctly responding to commands/data via the IBUS Protocol.

It also indicates to the XBIA module that all 4 IBUS cables are plugged into their correct slots. Each cable will have a unique IM XBIB POWER OK H signal. The signal will be placed at a different pin location on each cable. These 4 signals ANDED together on XBIA will assert a bit in an XBIA register that will signify that the cables are plugged into both the XBIA and the XBIB, and that they are plugged into their proper location on both modules.

* IM BUF BI RESET L -

IM BUF BI RESET L is a buffered version of BI RESET L which originates from the I/O BUS. When asserted the XBIA Module should assert XMI RESET L on the system Bus if IM XBIB POWER OK (3:0) H is also asserted.

* IM BI AC LO L -

IM BI AC LO L is a buffered version of BI AC LO L which originates from the I/O bus. When asserted the XBIA Module will set the BCI AC LO status bit in the "XBIA Error Summary Register" and generate an IVINTR (system power fail) to the system Bus.

XBIA TO XBIB CONTROL SIGNALS

* IR DMAA BUF AVAIL L -

IR DMAA BUF AVAIL L indicates that the DMA-A Buffer in the XBIA File 86 is available to be loaded by the XBIB Module with command and data (if applicable).

The XBIA Module asserts IM DMAA BUF AVAIL L when it has completed processing any pending command/data in the DMA-A Buffer over the first bus interconnect interface 68, thus indicating to the XBIB Module that the DMA-A buffer is available.

The XBIA Module de-asserts IR DMAA BUF AVAIL L when IM DMAA

-continued

BUF LOADED L is asserted by the XBIB Module, thus indicating that
a new command/data has been loaded into the DMA-A Buffer by the
XBIB Module.
* IR DMAB BUF AVAIL L -
    IR DMAB BUF AVAIL L indicates that the DMA-B Buffer in the
XBIA File 86 is available to be loaded by the XBIB Module with
command and data (if applicable).
    The XBIA Module asserts IM DMAB BUF AVAIL L when it has completed processing any pending command/data in the DMAB Buffer
over the bus adapter interface 68, thus indicating to the XBIB
Module that the DMA-B buffer is available.
    The XBIA Module deasserts IR DMAB BUF AVAIL L when IM DMAB
    BUF LOADED L is asserted by the XBIB Module, thus indicating that
    a new command/data has been loaded into the DMA-B Buffer by the
    XBIB Module.
* IR CPU BUF LOADED L -
    IR CPU BUF LOADED L indicates that a CPU command has been
loaded from the bus adapter interface 68 into the CPU Buffer of
the XBIA File 84 and is ready to be processed by the XBIB Module.
    IR CPU BUF LOADED L is deasserted by the XBIA Module when it
detects IM CPU XACTION DONE L or IM CPU XACTION DONE L and IM
XACTION FAULT L from the XBIB Module.
* IR XMI ERR BIT SET L -
    IR XMI ERR BIT SET L indicates that an error bit has been
set in one of the XBIA specific error registers. This status bit
causes the XBIB Module to initiate a Vectored Interrupt (INTR)
command to system bus 25.
* IR READ DATA AVAIL L
    IR READ DATA AVAIL L indicates that the data of a previously
initiated DMA Read transaction is available in the DMA-A/B Receive Buffer of the XBIA File 84 and may be read by the XBIB
Module.
    IR READ DATA AVAIL L is asserted by the XBIA Module when it
has loaded the XBIA File's DMA-A/B Receive Buffer with data from
the XMI Interface 68.
    IR READ DATA AVAIL L is deasserted by the XBIB Module via a
"direct clear input" to the latch/flop when it asserts IM CLR
READ STATUS L.
* IR READ DATA FAULT L -
    IR READ DATA FAULT L indicates that a previously initiated
DMA Read transaction has failed due to an unrecoverable failure
on first interconnect module 60.
    IR READ DATA FAULT L is asserted by the XBIA Module when it
has detected one of the following errors:
    o    RER Response decoded on the XMI Function Field.
    o    Read Sequence Error detected on the XMI Function Field.
    o    Timeout on system bus 25
    IR READ DATA FAULT L is deasserted by the XBIB Module via a
"direct clear input" to the latch/flop when it asserts IM CLR
READ STATUS L.
* IR DMA LOC RESPONSE L -
    IR DMA LOC RESPONSE L indicates that a previously initiated
DMA Read transaction has returned the "Locked Response" (LOC)
over first bus interconnect interface 68.
    IR DMA LOC RESPONSE L is asserted by the XBIA Module if a
LOC Response is detected on the XMI Function Field on DMA Read
Return Data.
    IR DMA LOC RESPONSE L is deasserted by the XBIB Module via a
"direct clear input" to the latch/flop when it asserts IM CLR
READ STATUS L.
* IR ADAPTER RESET L -
    IR ADAPTER RESET L is generated by asserting (Node Reset) in
the XBIA's XMI BER Register. The assertion of this signal will
cause a power-fail sequence to be initiated on the I/O bus 45.
* IR XMI AC LO H -
    IR XMI AC LO H originates from system bus 25. When asserted
the XBIB Module should assert BI AC LO on the I/O bus 45.
* IR XMI DC LO H -
    IR XMI DC LO H originates from the XMI system bus 25. When
asserted the XBIB Module should assert BI DC LO on the I/O bus
45
* IR XMI RESET L -
    IR XMI RESET L originates from system bus 25.

As discussed previously, a problem is presented in attempting to generate control signals according to the relatively fast bus cycle time of system bus 25 for transmission to circuitry operated in accordance with the slower bus cycle time of I/O bus 45. The present invention overcomes the problems of the prior art in a manner shown more clearly in FIG. 5.

Figure 5:
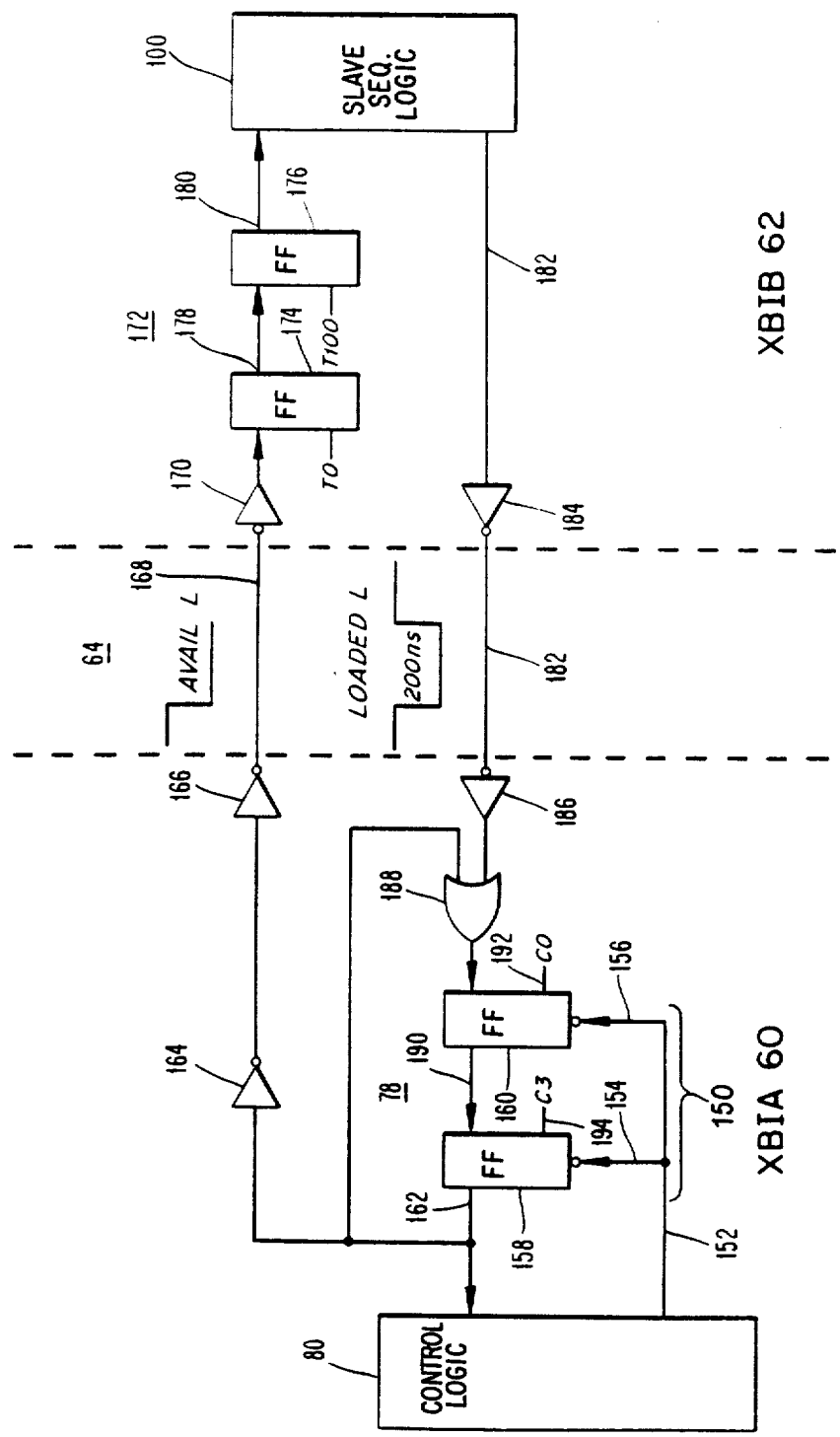
FIG. 5 is a schematic diagram illustrating the generation of status and control signals in the bus adapter of FIG. 2.

Referring to FIG. 5, a control signal 152 originating in control logic 80 of gate array 70 has a duration of 64 ns., that is, the cycle time of I/O bus 25. Signal 152 is fed to the respective RESET terminals 154 and 156 of flip-flops 158 and 160 which function as a dual-rank synchronizer 150 in synchronizer logic circuit 78. This causes the synchronizer flip-flops 158 and 160 to reset. The output 162 of flip-flop 158 is deasserted when flip-flop 158 is reset. The deasserted output 162 of flip-flop 158 is supplied through an inverter 164 and an inverting driver 166 to form a status signal 168 (asserted low) on IBUS 64. Control signal 152 is thus converted to the asserted state of status signal 168, AVAIL L, having an indefinite assertion time. Status signal 168 is deasserted only in response to a LOADED L signal received by XBIA module 60 over IBUS 64.

Signal 168, AVAIL L, is supplied through an inverting bus receiver circuit 170 to the input of a dual-rank synchronizer 172 composed of flip-flops 174 and 176. Flip-flop 174 is clocked by one phase of the multiphase clock signal derived from the clock signal which controls I/O bus 45. The output 178 of flip-flop 174 is supplied to the input of flip-flop 176. The output signal 180 from flip-flop 176 is clocked by the clock terminal which is supplied by a second phase of the multiphase clock signal derived from the clock signal controlling I/O bus 45. The output 180 of flip-flop 176 is reliably established at the logic level of the status signal 168, AVAIL L, due to the synchronizing effect of dual-rank synchronizer 172. Thus, control signal 152 derived from the clock signal of relatively fast system bus 25 has been accurately and reliably captured for use by circuit 100 operated synchronously to a clock signal derived from the relatively slow I/O bus 45.

Circuit 100, after detection of the synchronized status signal from output 180, and after the completion of a DMA transaction transfer to the XBIA module 60, generates a control signal 182 having a finite duration of, for example, 200 ns., the bus cycle time of I/O bus 45. The invention includes deassertion means coupled to the control means over the interconnect bus for deasserting the status signals in response to the second group of first control signals. As embodied herein, the deassertion means comprises a bus receiver circuit 186 and a two-input OR gate 188.

Control signal 182 is supplied through a driver circuit 184 over IBUS 64 and through receiver circuit 186 to OR gate 188. The output of OR gate 188 is supplied to the input of flip-flop 160 of dual-rank synchronizer 150. The clock terminal 192 of flip-flop 160 is supplied with one phase of the multiphase clock signal derived from the fast clock signal, for example, 64 ns., which controls system bus 25. The output 190 of flip-flop 160 is supplied to the input of flip-flop 158, the clocked terminal 194 of which is supplied with a second phase of the multiphase clock signal derived from the fast clock signal controlling system bus 25. Output signal 162 is fed back to an input terminal of OR gate 188, thus preventing flip-flops 158 and 160 of synchronizer 150 from being reset by their clock input terminals 192 and 194. The output 162 of flip-flop 158 is reliably established at the asserted logic state of the control signal 182, LOADED L, for use by circuit 80 operated synchronously to a clock signal derived from the system bus 25. Thus, control signal 182 derived from the clock signal of relatively slow I/O bus 45 has been accurately and reliably captured for use by circuit 80 operated synchronously to a clock signal derived from the relatively fast system bus 25. Control logic circuit 80 then initiates a transaction on system bus 25 to transmit data in the buffer associated with the AVAIL and LOADED signals onto system bus 25.

The asserted output 162 of flip-flop 158 is also supplied through inverter 164 and inverting driver 166 to IBUS 64. Control signal 152 is thus converted to the deasserted state of status signal 168, AVAIL.

Slave sequencer logic circuit 100 controls all transfers adapter modules 60 and 62.

The signals indicated at 130 in FIG. 4 which propagate from XBIA module 60 to XBIB module 62 operate in the same manner as signal 168 of FIG. 5 and constitute a first group of first control signals. The signals indicated at 130 in FIG. 4 which propagate from XBIB module 62 to XBIA module 60 operate in the same manner as signal 182 of FIG. 5 and constitute the second group of first control signals.

For example, when a buffer of register file 86 is available for receipt of data, a BUFFER AVAILABLE signal is generated and supplied over IBUS 64. Data may then be written from XBIB module 62 into the register files associated with the BUFFER AVAILABLE signal. When all of the required data, as determined by the type of transaction being executed, has been written into the buffer, XBIB module 62 generates a BUFFER LOADED signal having an assertion time duration equal to the cycle time of I/O bus 45.

Figure 6A:
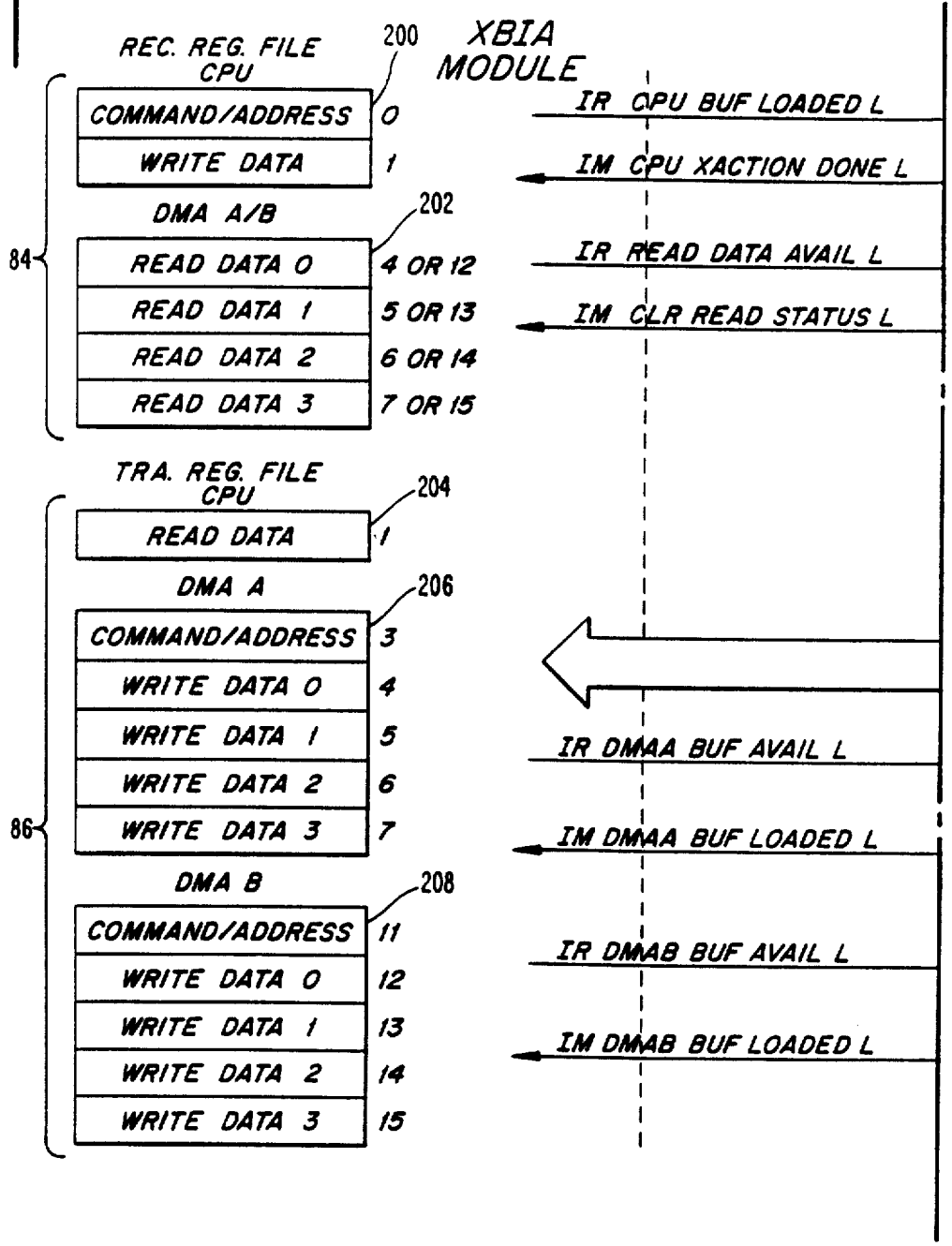

Referring to FIGS. 6A and 6B, buffer storage area 82, including register files 84 and 86, consists of seventeen storage locations specified by addresses 0-15 and by command lines I(3:0). The addresses of buffer storage area 82 are asserted on FADDR address lines of IBUS 64 by XBIB module 62 to cause data to be written to or read from the addressed storage locations of buffer area 82 over IBUS data lines D(31:0), IBUS command lines I(3:0) and IBUS parity P(0).

The locations of buffer area 82 are organized functionally into a CPU WRITE buffer 200 and a DMA A/B buffer 202 of receive register file 84 and into CPU READ buffer 204, DMA-A WRITE buffer 206, and DMA-B WRITE buffer 208 of transmit register file 86.

Register files 84 and 86, and IBUS signals associated with the register files, are shown more clearly in FIG. 6A. Receive register file 84 forms a temporary storage location for data originating from a node connected to system bus 25 which is destined for a node connected to I/O bus 45. Correspondingly, transmit register file 86 forms a series of temporary storage locations for data originating from a node connected to I/O bus 45 which is destined for a node connected to system bus 25. Receive register file 84 is a read-only file with respect to IBUS 64 and transmit register file 86 is a write-only file with respect to IBUS 64.

Increased performance is obtained in the preferred embodiment by providing a plurality of DMA-WRITE buffers, thus taking advantage of the pended nature of system bus 25. More or fewer buffers may be provided according to the requirements of the particular application.

CPU WRITE buffer 200 comprises a first location, having a buffer storage area address of 0, for storing a command/address word received from system bus 25 in connection with a CPU transaction, that is, a transaction initiated by a node connected to system bus 25. CPU WRITE buffer 200 includes a second storage location having an address of 1 for storing data to be written from system bus 25 into a node connected to I/O bus 45.

DMA READ buffer 202 of receive register file 84 consists of four locations for storing data which has been retrieved from a memory node connected through system bus 25 in response to a READ transaction initiated by a node connected to I/O bus 45.

CPU portion 204 consists of a single storage location for a temporary storage of data retrieved from an I/O device connected to I/O bus 45 in response to a READ transaction initiated by a node connected to system bus 25. Identical DMA WRITE buffers 206 and 208 provide temporary storage of command/address words destined for a node connected to system bus 25 in response to a WRITE transaction initiated by a node connected to I/O bus 45. The addresses of the respective storage locations of register files 84 and 86 are shown to the right of the respective storage locations in FIG. 6A. Separate BUFFER AVAILABLE and BUFFER LOADED signals are associated with each DMA TRANSMIT buffer.

Figure 7:
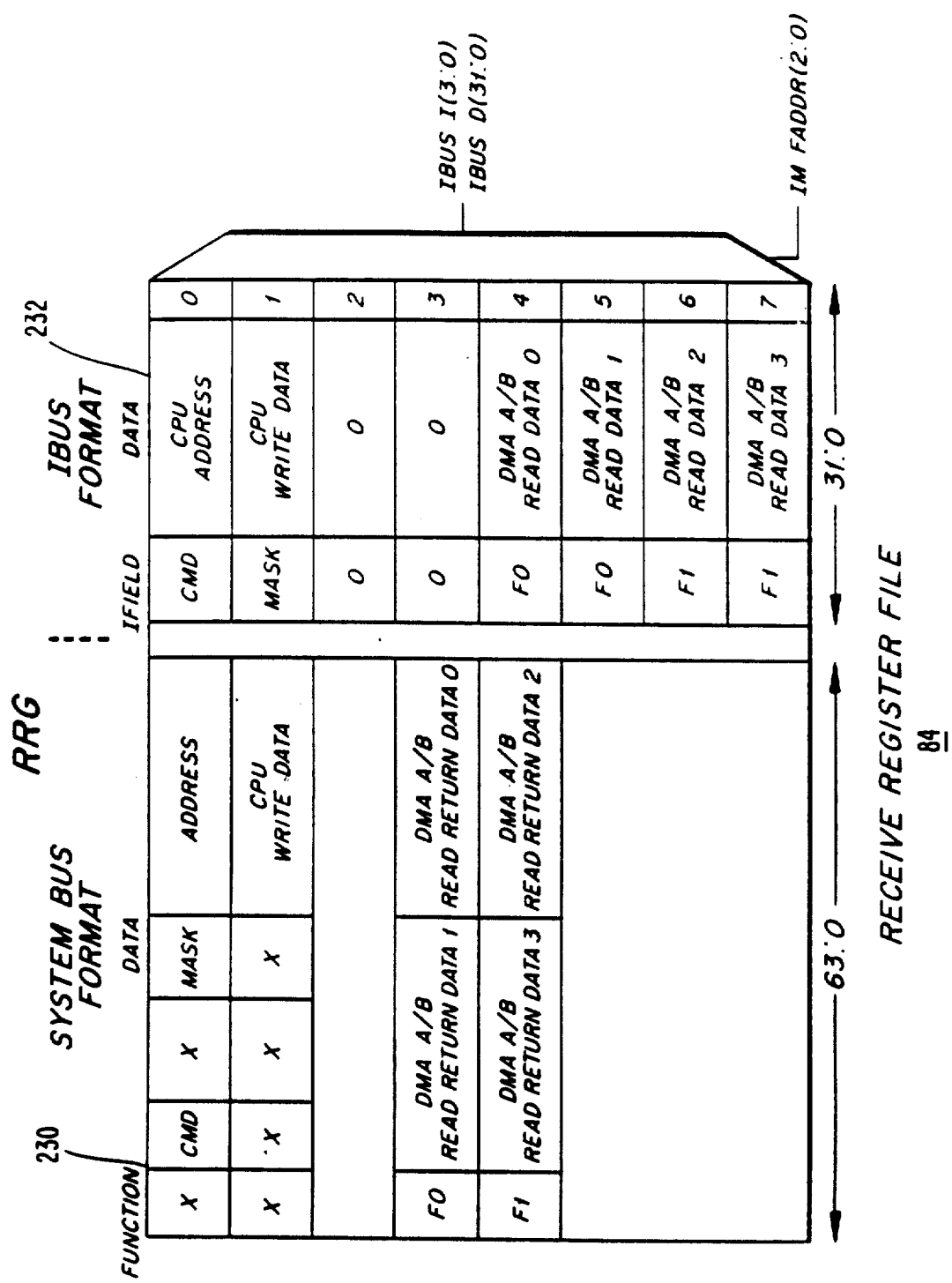
FIG. 7 is a detailed diagram showing the format of the receive register file shown in FIG. 2.

FIG. 7 illustrates the format of data stored in receive register file 84. Register file 84 is shown in FIG. 7 in a system bus format configuration 230 and an IBUS format 232. It is to be understood that only a single set of storage locations is provided in register file 84. However, data is read into register file 84 from system bus 25 in the format shown at 230 and is read out of register file 84 over IBUS 64 in the format shown at 232. Storage of data in format 230 is controlled by control logic 80 and is read out from register file 84 in the format specified by slave sequencer logic 100 or master sequencer logic circuit 98 of XBIB module 62.

Figure 8:
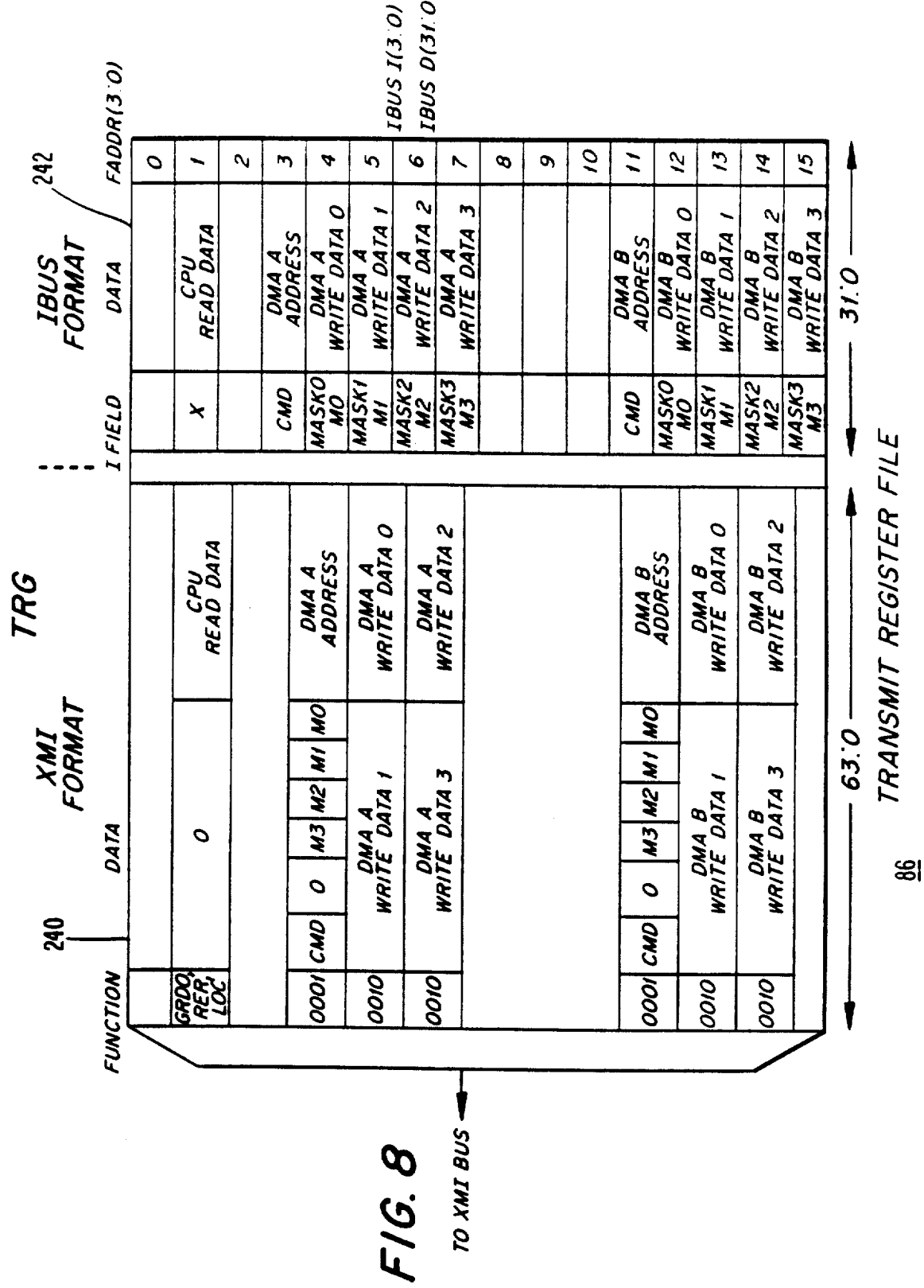
FIG. 8 is a detailed diagram showing the format of the transmit register file of FIG. 2.

In a similar manner, FIG. 8 illustrates the format of data stored in register file 86. Data is received from IBUS 64 in a 32-bit format for storage in storage locations numbered 0-15 as shown in format 242. Data stored in these storage locations is then read out and transmitted to system bus 25 in the format shown at 240. It is to be understood that formats 240 and 242 represent exactly the same storage locations but merely represent differences in the manner in which the data is written into such storage locations and read out of the storage locations.

When a WRITE transaction has been initiated by a node connected to a system bus 25 and a command/address and WRITE data word have been stored in CPU portion 200 of receive register file 84, control logic 80 asserts the CPU BUFFER LOADED signal which is transmitted over interconnect bus 64 to XBIB module 62 as a status signal having an indefinite assertion duration time. This signal is supplied to master sequencer logic circuit 98 which reads the command/address and data words from CPU WRITE buffer 200. This is accomplished by asserting the FILE READ ENABLE signal on IBUS 64 to set the direction of data transfer over IBUS 64 from XBIA module 60 to XBIB module 62, generating an address of zero on the FADDR address lines and loading the command/address on IBUS 64 into the data path registers and transfer logic 96. When the command/address word has been received from location zero as shown in FIG. 6A, master sequencer logic circuit 98 generates an address of "1" on the FADDR lines and loads the WRITE data information on IBUS 64 into the data path registers and transfer logic 96. Master sequencer logic circuit 98 then generates appropriate signals on control lines 102 to cause the data to be transferred from data path register and transfer circuit 96 over BCI bus 94 and bus interface circuit 92 to I/O bus 25. When master sequencer logic circuit 98 has completed the operation, it asserts the CPU XACTION DONE signal to cause control logic circuit 80 in XBIA module 60 to deassert the CPU BUFFER LOADED signal.

In a similar manner, when a memory device on system bus 25 transmits data from system bus 25 into XBIA module 60 in response to a READ transaction initiated by a node connected to I/O bus 45, control logic 80 generates the READ DATA AVAILABLE signal for an indefinite assertion duration. Slave sequencer logic circuit 100 processes the READ data, sends it to the requesting node on I/O bus 45, and then generates the CLEAR READ STATUS signal, to cause control logic circuit 80 to deassert the READ DATA AVAILABLE signal.

In a similar manner, slave sequencer logic circuit 100 monitors the status of BUFFER AVAILABLE signals. When a node connected to I/O bus 45 desires to write data to a node connected to system bus 25, slave sequencer logic circuit 100 samples BUFFER AVAILABLE signals associated with DMA A buffer and DMA B buffer, and writes command/address and data words to a buffer if the corresponding BUFFER AVAILABLE signal is asserted by sequentially energizing the FADDR address lines to select specific storage locations, deasserting the FILE READ ENABLE line to reverse the direction of transmission over IBUS 64, and writing the command/address and data words into the appropriate storage location by momentarily asserting the FILE LOAD STROBE signal. When the writing operation is completed by the XBIB module, slave sequencer logic circuit 100 asserts the appropriate BUFFER LOADED signal, causing control logic 80 to deassert the corresponding buffer available signal and initiate the transmission of the command/address and data words from the buffers to system bus 25.

FIGS. 9, 10, 11, and 12 illustrate and explain in greater detail the operation of signals on IBUS 64 to transfer data between system bus 25 and I/O bus 45.

FIG. 9 is a timing diagram showing the interrelationship of signals on IBUS 64 generated by slave sequencer logic circuit 100 and control logic circuit 80 during the execution of a DMA WRITE transaction in which four data words are transmitted from a node connected to I/O bus 45 to a node connected to system bus 25. This transaction, referred to in the aforementioned U.S. patent and U.S. patent application Ser. No. 07/044,952 as an octa-word WRITE transaction, is recognized by the presence of the appropriate command code on the BCI I(3:0) lines, which directly correspond to the command lines of I/O bus 45. Each transaction on IBUS 64 is controlled by XBIB module 62 in accordance with standard transaction sequences of I/O bus 45 as explained more completely in the aforementioned U.S. Pat. No. 4,661,905.

When slave sequencer logic circuit 100 detects a code calling for an octa-word WRITE transaction, it samples the status of the BUFFER AVAILABLE lines corresponding to DMA-A and DMA-B WRITE buffers of transmit register file 86 at the point 300 of FIG. 9. Since a BUFFER AVAILABLE signal is asserted, slave sequencer logic circuit 100 writes the command/address information received over the I/O bus 45 into the command/address location in transmit register file 86. Assuming that DMA A buffer was available, this is accomplished by placing a "3" on the FADDR address lines, corresponding to the address of the command/storage location in DMA-A buffer 206, as shown in FIG. 6A. During the time the address code is asserted on the FADDR address lines of IBUS 64, slave sequencer logic circuit 100 will assert the FILE LOAD STROBE signal as indicated at 304 of FIG. 9. Since the FILE READ ENABLE line is deasserted, IBUS 64 will effect a transfer of information from XBIB module 62 to XBIA module 60, causing the command/address information received over BCI bus 94 from I/O bus 45 to be placed into the command/address storage location in DMA-A buffer 206. No data is transmitted across IBUS 64 during the I/O bus cycle following bus cycle 302, a cycle during which other functions are usually performed during a normal transaction on I/O bus 45.

During the next four bus cycles, indicated at 306, slave sequencer logic circuit 100 sequentially places the addresses 4, 5, 6, and 7 associated with WRITE data storage locations in DMA-A WRITE buffer 206 on FADDR lines of IBUS 64, as shown in FIG. 6A.

While the appropriate addresses are asserted on the FADDR address lines of IBUS 64, the FILE LOAD STROBE signal is asserted to cause the WRITE data information received over I/O bus 45 to be written from XBIB module 62 into the appropriate storage locations of DMA-A buffer 206.

Simultaneously with the assertion of the last data word of the transaction, slave sequencer logic circuit 100 will assert the BUFFER LOADED signal associated with the DMA-A buffer, indicating that XBIB module 62 has completed the loading of the buffer. As previously described, the BUFFER LOADED signal will cause the BUFFER AVAILABLE signal to be deasserted and control logic circuit 80 will initiate a transaction on system bus 25 to cause the WRITE data information to be transmitted over system bus 25 to the destination node, according to the standard system bus protocol described in the aforementioned U.S. patent application Ser. No. 07/044,952.

After a period of time, determined by the ability of XBIA module 60 to successfully arbitrate for control of system bus 25, a WRITE transaction will be completed over system bus 25 causing emptied. At this time, control logic 80 will reassert the appropriate BUFFER AVAILABLE signal, indicating that DMA-A WRITE buffer is once again available for receipt of data from XBIB module 62.

FIG. 10 is a representative timing diagram showing the operation of slave sequencer logic 100 and control logic 80 in generating signals over IBUS 64 to perform a DMA octa-word READ transaction, that is, a transaction initiated by a node connected to I/O bus 45, to cause four 32-bit words to be retrieved from a storage node connected to system bus 25 and to be returned over IBUS 64 and I/O bus 45 to the initiating node. The appropriate node command information is received from I/O bus 45 and supplied to slave sequencer logic circuit 100 over BCI I(3:0) lines. The information is decoded by slave sequencer logic circuit 100 as a request for an octa-word READ transaction. Slave sequencer logic circuit 100 samples BUFFER AVAILABLE lines at the time indicated in FIG. 10 at 320 and detects that a BUFFER AVAILABLE signal is asserted. Slave sequencer logic circuit 100 then places an address of "3" on the FADDR address lines of IBUS 64, corresponding to the address of the command/address storage location in DMA-A WRITE buffer 206.

The FILE LOAD STROBE signal is momentarily asserted at 324 to cause the command/address information received from I/O bus 45 to be written into the command/address storage location of DMA-A buffer 206. Since the amount of data necessary to be transferred from XBIB module 62 to XBIA module 60 for a DMA READ transaction is only a single command/address word, the appropriate BUFFER LOADED signal is asserted simultaneously with the writing of the command/address word into the command/address storage location of DMA-A buffer 206. This causes the BUFFER AVAILABLE signal to be deasserted by control logic circuit 80. The BUFFER AVAILABLE signal will be deasserted synchronously with a phase of a multiphase clock derived from the clock signal controlling system bus 25. Thus, the BUFFER AVAILABLE signal will be deasserted during a short period of uncertainty, corresponding to the time period of the multiphase clock signal, as indicated at 326. The BUFFER LOADED signal causes control logic circuit 80 to initiate a READ transaction on system bus 25. Since I/O bus 45 is a non-pended bus, all traffic on I/O bus 45 is suspended until completion of the requested READ transaction.

After a period of time determined by traffic on system bus 25, the storage node connected to system bus 25 which contains the information requested in the READ transaction will initiate a transaction on system bus 25 to cause the requested data to be transmitted to XBIA module 60. After slave sequencer logic circuit 100 has loaded the command/address data word into the DMA-A transmit buffer, slave sequencer logic circuit 100 asserts the FILE READ ENABLE signal, as indicated at 327, to set up IBUS 64 for a flow of data from XBIA module 60 to XBIB module 62. Control logic circuit 80 then asserts the BUFFER AVAILABLE signal, as shown at 328 after the command/address data word has been successfully transmitted onto system bus 25.

When the requested data has been received by XBIA module 60 and stored in DMA READ data buffer 202, control logic circuit 80 will assert a READ DATA AVAILABLE signal, as indicated at 330. Slave sequencer logic 100 in XBIB module 62 responds to the READ DATA AVAILABLE signal by sequentially placing the addresses of the storage locations of READ data buffer 202 onto the FADDR address lines of IBUS 64. Since the FILE READ ENABLE signal is asserted, data present in the storage locations of READ data buffer 202 is transferred from the XBIA module 60 to XBIB module 62. When the last word of the four-word READ transaction has been read by XBIB module 62, slave sequencer logic circuit 100 asserts the CLEAR READ STATUS signal as shown at 334 which causes the READ DATA AVAILABLE signal to be deasserted, as indicated at 336.

FIGS. 11 and 12 respectively show timing diagrams of representative CPU WRITE and READ transactions, that is, transactions initiated by nodes connected to system bus 25 to either write data to a node connected to I/O bus 45 or to read data from a node connected to I/O bus 45. Note that only a single thirty-two bit word can be transferred between system bus 25 and I/O bus 45 as a result of a CPU transaction.

The CPU WRITE transaction on bus adapter 41 is initiated by a WRITE transaction on system bus 25 performed by a connected node. This results in command/address and data information being stored in a CPU WRITE buffer 200 (FIG. 6) of receive register file 84 (FIG. 2). This is accomplished by action of bus adapter interface circuit 68 and control logic 80. Control logic 80 then asserts the CPU BUFFER LOADED signal on IBUS 64, as shown at 350 of FIG. 11.

Master sequencer logic circuit 98, in response to the CPU BUFFER LOADED signal, places a "0" on FADDR address lines, as indicated at 352, and asserts the FILE READ ENABLE signal to set IBUS 64 to supply data from XBIA module 60 to XBIB module 62. The command/address information present in the storage location 0 of CPU buffer 200 is then transferred to the data path registers and transfer logic 96 of XBIB module 62 and decoded by master sequencer logic circuit 98. Master sequencer logic circuit 98 then places a 1 on FADDR address lines as indicated at 354 causing the WRITE data information present in the storage location one of CPU buffer 200 to be transferred to the data path registers and transfer logic 96 of XBIB module 62. Master sequencer logic circuit 98 then initiates a WRITE transaction, via bus interface circuit 92, over I/O bus 45 to place the WRITE data in the node connected to the I/O bus 45 as designated by the command/address information. Master sequencer logic circuit 98 asserts the CPU XACTION DONE signal over IBUS 64 causing control logic circuit 80 of XBIB module 60 to asynchronously deassert the CPU BUFFER LOADED signal as indicated at 360. This completes the CPU WRITE transaction.

FIG. 12 is a timing diagram showing the logic state of signals generated by control logic circuit 80 and master sequencer logic circuit 98 in response to a representative CPU READ transaction, that is, a transaction initiated by a node connected to system bus 25 to retrieve data stored in a node connected to I/O bus 45. The CPU READ transaction on adapter 41 is initiated by a READ transaction on system bus 25, which is received by XBIA module 60. The appropriate command/address information is stored in the CPU buffer 200 of receive register file 84 by bus interface circuit 68 and control logic circuit 80. Control logic circuit 80 then asserts the CPU BUFFER LOADED signal, as indicated at 370 of FIG. 12. Master sequencer logic circuit 98 then asserts the FILE READ ENABLE signal and places a 0 on FADDR address lines of IBUS 64, as shown at 372, to cause the command/address information present in location 0 of CPU buffer 200 to be read into the data path registers and transfer logic 96 of XBIB module 62. Master sequencer logic circuit 98 decodes the command/address information thus received and interprets it as a READ transaction. Master sequencer logic circuit 98 then initiates a READ transaction on I/O bus 45, through bus interface circuit 92, and deasserts the FILE READ ENABLE signal as shown at 374.

After a period of time determined by traffic on I/O bus 45, the requested data is received by XBIB module 62 over I/O bus 45. Master sequencer logic circuit 98 places the data in the data path registers and transfer logic 96, places a "1" on FADDR address lines of IBUS 64, and asserts the FILE LOAD STROBE signal at 376 to cause the received READ data to be written into the READ data storage location 1 of CPU buffer 204 of transmit register file 86. Master sequencer logic circuit 98 also asserts the CPU XACTION DONE signal on IBUS 64, indicating the completion of the CPU transaction. This signal is received by control logic circuit 80, which then deasserts the CPU BUFFER LOADED signal and initiates a READ response, transaction on system bus 25.

Figure 13A:
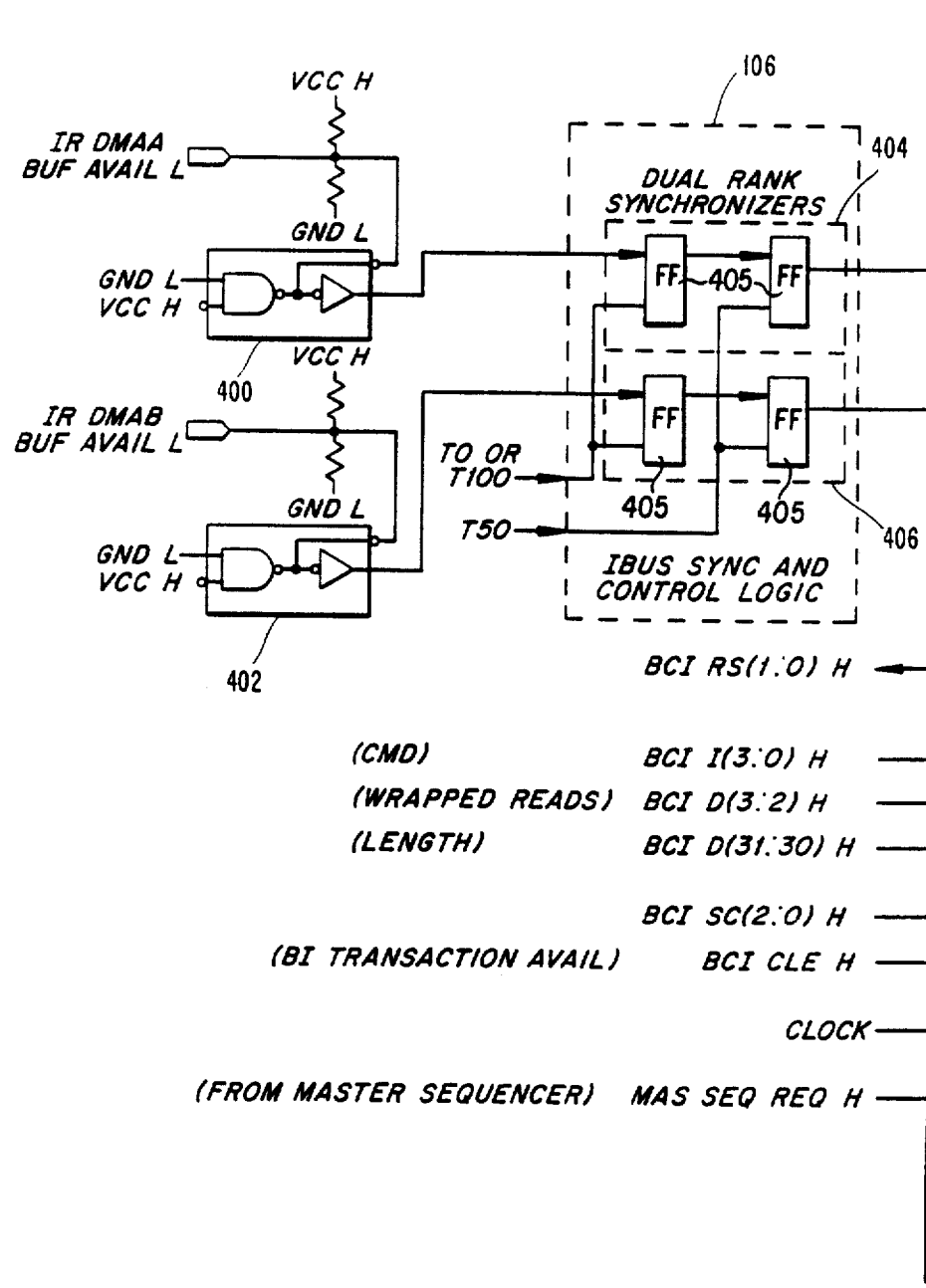
FIGS. 13A and 13B are block diagrams, partially schematic, showing a portion of the circuitry of the I/O bus adapter module of FIG. 2.
Figure 13B:
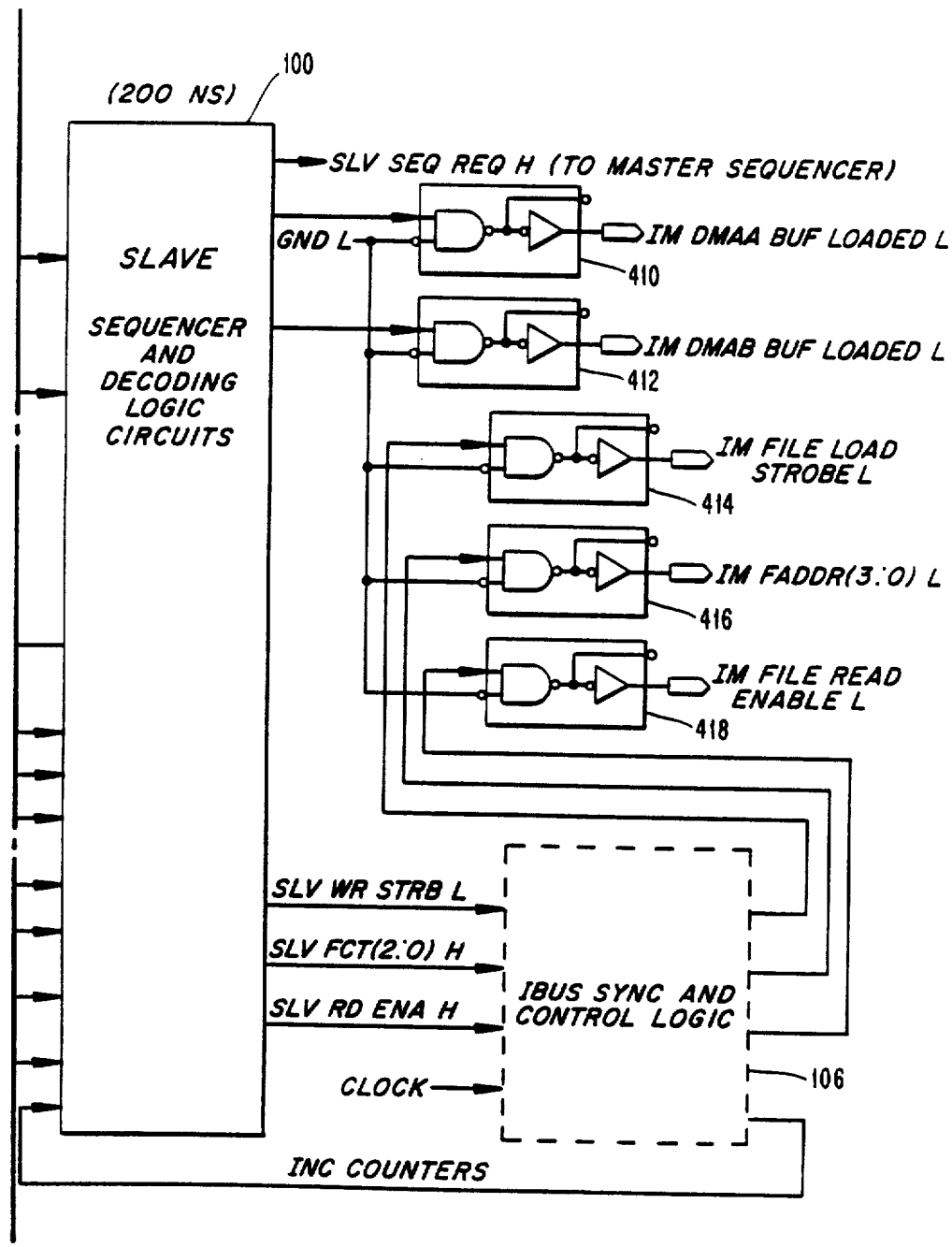

FIGS. 13A and 13B show the structure of slave sequencer logic circuit 100, synchronization and control logic circuit 106, and interconnect interface circuit 90 in greater detail. BUFFER AVAILABLE signals associated with DMA-A and DMA-B WRITE buffers, respectively, are supplied to respective bus transceiver circuits 400 and 402 of IBUS 64. Bus transceiver circuits may comprise, for example, type 26S10 devices commercially available from the AMD Corporation of Sunnyvale, Calif.

Synchronization and control logic circuit 106 includes synchronizing circuitry coupled to the control logic circuit 80 and cynchronizer logic circuit 78 over the IBUS 64 for gating the status signals to slave sequencer logic 100 in accordance with the clock signal controlling I/O bus 45. As embodied herein, the, synchronizing circuitry comprises dual-rank synchronizers 404 and 406 including flip-flops 405, which the outputs of transceiver circuits 400 and 402 are respectively supplied. Dual rank synchronizer circuits 404 and 406 may each be constructed of type 74F374 flip-flop circuits commercially available from the Texas Instruments Corporation. The clock terminals of the first flip-flop of dual-rank synchronizers 404 and 406 are supplied by a first phase of a multiphase clock signal derived from the clock signal which establishes the cycle time of I/O bus 45. In the preferred embodiment, such clock signal may constitute either a T0 or T100 clock signal, as shown in FIG. 3B.

The clock terminal of the second flip-flop of dual-rank synchronizers of 404 and 406 is supplied by a second phase of the multiphase clock signal of FIG. 3B, such as, for example, the T50 clock signal.

The output of dual-rank synchronizers 404 and 406 constitute a control signal synchronized to the clock signal controlling I/O bus 45, a control signal which was derived from a status signal asserted in synchronism to a clock signal controlling system bus 25. The outputs of dual-rank synchronizers 404 and 406 are supplied to slave synchronizer logic circuit 100. Other inputs to slave synchronizer 100 consist of bus signals from the BCI bus derived from bus signals of I/O bus 45, including BCI CLE and BCI SC. Multiphase clock signals generated by XBIB clock generation circuit 112 and a signal from master sequencer logic circuit 98 are also supplied to slave sequencer logic circuit 100 to ensure that slave sequencer logic circuit 100 does not initiate a transaction in conflict with master sequencer logic circuit 98.

Outputs from slave sequencer logic circuit 100 include a pair of signals directly supplied to bus transceiver circuits 410 and 412 of interconnect interface circuit 90 to form BUFFER LOADED signals associated with the DMA-A and DMA-B WRITE buffers of transmit register file 86. Other outputs from slave sequencer logic circuit 100 are supplied to synchronization and control logic circuit 106, for appropriate synchronization with multiphase clock signals T0, T50, T100 and T150 to be supplied to bus transceiver circuits 414, 416, and 418 to respectively form FILE LOAD STROBE, FADDR, (3:0) and FILE READ ENABLE signals. An output of synchronization and control logic circuit 106 is fed back to slave sequencer logic circuit 100 to provide a count of words transmitted over IBUS 64 to enable slave sequencer logic circuit 106 to preferably determine when all data of the required amount of data for a particular transaction has been transmitted, thus permitting proper generation of the BUFFER LOADED signal.

Figure 14A:
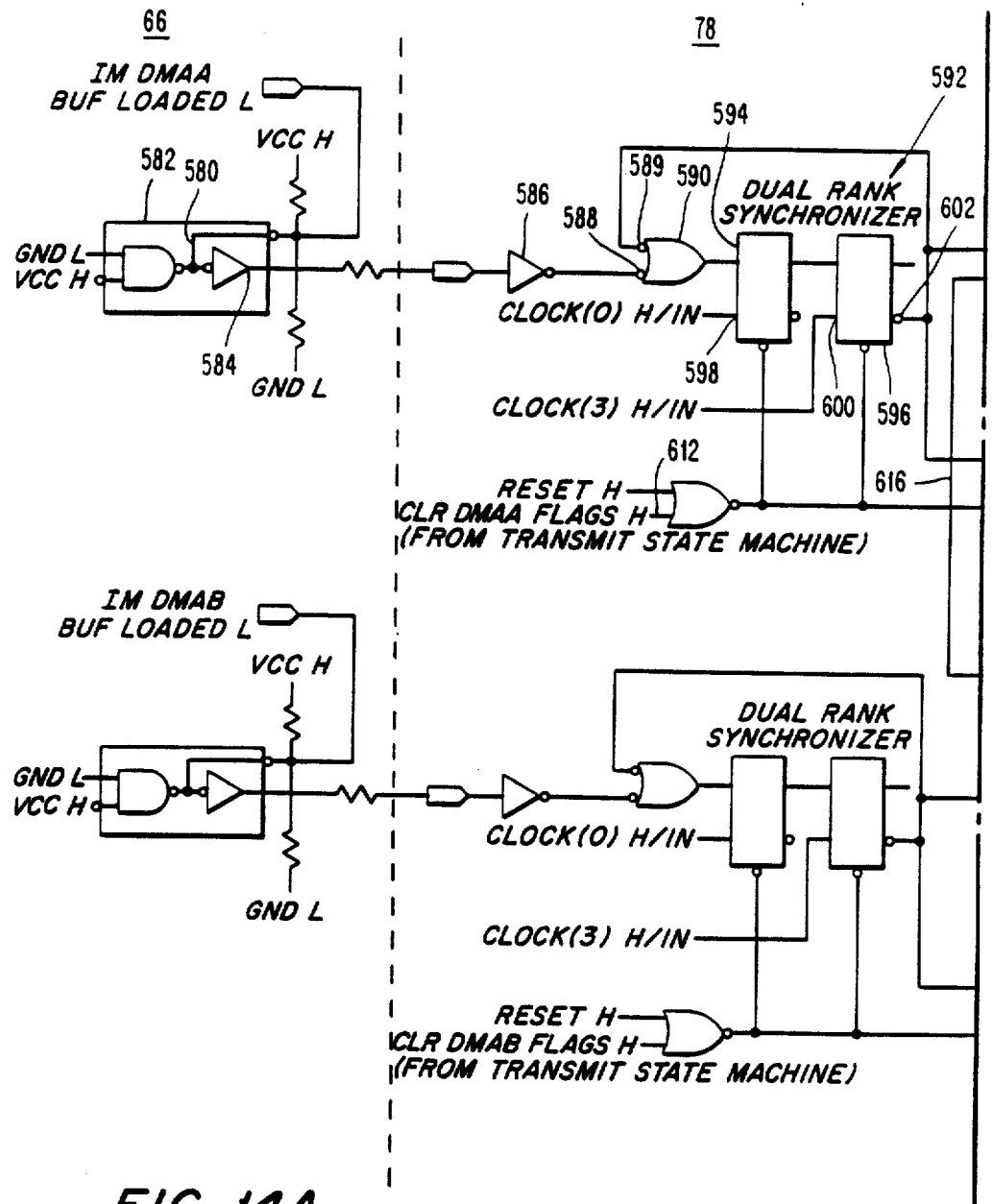
FIGS. 14A and 14B are schematic diagrams illustrating a portion of the circuitry present in the gate array of the system bus adapter module shown in FIG. 2.
Figure 14B:
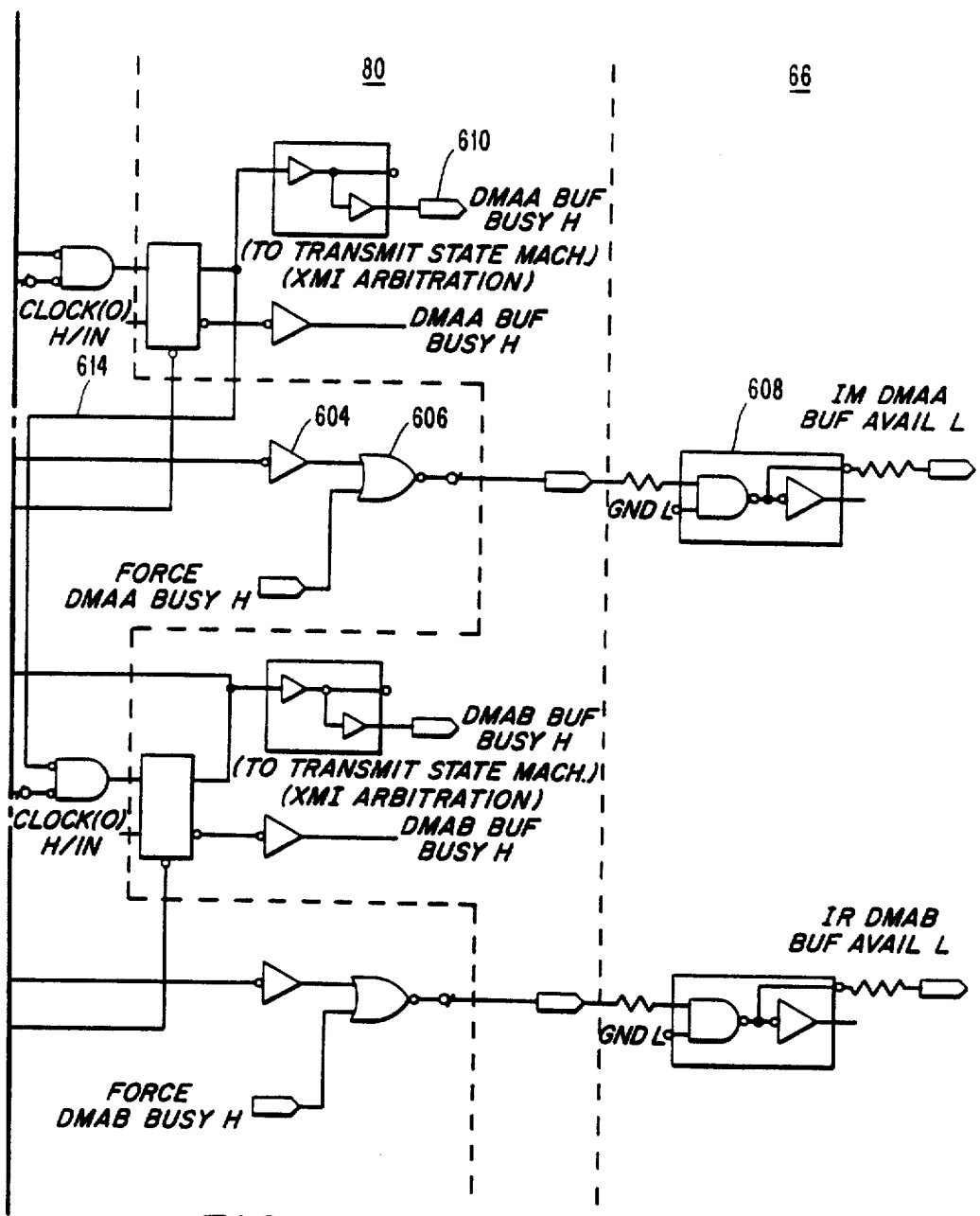

FIG. 14A and 14B show a representative portion of control logic circuit of gate array 70 which embodies the present invention. A BUFFER LOADED signal associated with DMA-A WRITE buffer of transmit register file 86 is supplied to the input terminal 580 of a bus transceiver circuit 582 contained in interconnect interface circuit 66. The output 584 of transceiver circuit 582 is supplied through an inverting driver 586 to an inverted input 588 of a two-input OR gate 590. The output of OR gate 590 is supplied to the input of a dual-rank synchronizer 592 consisting of flip flops 594 and 596. The clock input 598 of flip-flop 594 is supplied with one phase of a multiphase clock signal derived from the clock signal controlling system bus 25 by bus interface circuit 68. The clock input 600 of flip-flop 596 is supplied with a second phase of the multiphase clock signal derived froms system bus 25. The output 602 of dual-rank synchronizer 592 is supplied to an inverting input 589 of OR gate 590, thus ensuring that output signal 602 constitutes a status signal having an indefinite assertion period.

Signal 602 is supplied through an inverter 604 and a NOR gate 606 (used to test control logic circuit 80) to a bus transceiver circuit 608 of interconnect interface circuit 66 to form a BUFFER AVAILABLE status signal. Circuitry is also provided to generate an internal BUFFER BUSY signal to be supplied to a transmit state machine constituting a portion of control logic circuit 80 which generates appropriate internal control signals to implement the functions herein described. A CLEAR signal 612 is supplied from the transmit state machine to the reset terminals of flip-flops shown in FIG. 14A, generated in response to the transmit state machine having completed its transaction over system bus 25 and, therefore, having emptied the DMA-A WRITE buffer.

Corresponding circuitry responsive to a BUFFER LOADED signal to generate a BUFFER AVAILABLE signal is supplied in connection with the DMA-B WRITE buffer of transmit register file 86. Signals 614 and 616 are provided to coordinate circuitry associated with the A and B buffers to ensure that only one buffer can generate a transaction on system bus 25 at any one time.

As described above, adapter module 41 permits transfer of data between system bus 25 and I/O bus 45 in response to transactions initiated either on system bus 25 or I/O bus 45. Thus, XBIA module 60 can function as either a commander or a responder with respect to sytem bus 25 and XBIB module 62 can function as either a commander or responder with respect to I/O bus 45. However, using the apparatus and method of the present invention, XBIA module 62 always functions as a responder with respect to IBUS 64 and XBIB module 62 always functions as a commander with respect to IBUS 64.

Control signals associated with control of data from XBIA module 60 to XBIB module 62 all function as status signals having an indefinite assertion duration. Control signals associated with control of data over IBUS 64 from XBIB module 62 to XBIA module 60 all function as control signals having a finite assertion duration. Moreover, control signals initiated by XBIA module 60 all operate synchronously with respect to a clock signal derived from the system bus clock signal and control signals generated by XBIB module 62 all operate synchronously with respect to the I/O bus 45 clock signal. This permits elimination of the request/grant protocol over the IBUS 64, resulting in higher performance data transfer, and ensures that control signals between XBIA module 60 and XBIB module 62 will be reliably received using circuitry of lower complexity than the prior art.

It will be apparent to those skilled in the art that various modifications and variations can be made in the apparatus and method of the present invention. Thus it is intended that the specification and drawings be considered as exemplary only, with the true scope and spirit of the invention being indicated by the following claims.

We claim:

1. A bus adapter for providing an information path between first and second busses in a computer system, the first and second busses each propagating data during repetitive bus cycles respectively controlled by first and second clock signals, the first bus having a cycle time faster than the second bus, the adapter comprising:

an interconnect bus;

a first adapter module comprising a first interconnect interface circuit connected to the interconnect bus, a first bus interface circuit including means for connection to the first bus, a buffer coupled to the first bus interface circuit for storing data to be transferred from the second bus to the first bus, and first control means coupled to the buffer and the first interconnect interface circuit for asserting a BUFFER AVAILABLE signal on the interconnect bus which indicates when the buffer is ready to receive data, for deasserting the BUFFER AVAILABLE signal only in response to a BUFFER LOADED signal received over the interconnect bus which indicates when data has been transmitted to the first adapter module, and for activating the first bus interface circuit to transmit data from the buffer to the first bus in response to the BUFFER LOADED signal; and a second adapter module comprising a second interconnect interface circuit connected to the interconnect bus, a second bus interface circuit coupled to the second interconnect interface circuit and including means for connection to the second bus, and second control means coupled to the second interconnect interface circuit and second bus interface circuit for initiating transactions which transfer data between the first and second busses over the interconnect bus is response to signals received over the second bus, the transactions requiring transmission of a predetermined amount of data from the second adapter module to the first adapter module, the second control means comprising means for transmitting data from the second adapter module to the first adapter module over the interconnect bus only when the BUFFER AVAILABLE signal is asserted and means for generating a BUFFER LOADED signal when the predetermined amount of data has been transmitted to the first adapter module.

2. An adapter as recited in claim 1 wherein the first adapter module is operated in response to the first clock signal and the second adapter module is operated in response to the second clock signal.

3. An adapter as recited in claim 2 wherein the BUFFER AVAILABLE signal is asserted asynchronously to the second clock signal and the BUFFER LOADED signal is generated asynchronously to the first clock signal.

4. An adapter as recited in claim 3 comprising synchronizing means for gating the BUFFER AVAIL- ABLE signal to the second control means in response to the second clock signal.

5. An adapter as recited in claim 4 wherein the synchronizing means comprises a dual-rank synchronizer.

6. An adapter as recited in claim 5 comprising means for generating a multiphase clock signal from the second clock signal, and the dual-rank synchronizer is controlled by at least two phases of the multiphase clock signal.

7. An adapter as recited in claim 1 wherein:
the first adapter module comprises a plurality of buffers, and the first control means asserts a separate BUFFER AVAILABLE signal on the interconnect bus for each of the buffers when the respective buffer is capable of receiving data, deasserts each BUFFER AVAILABLE signal only in response to a corresponding separate BUFFER LOADED signal received over the interconnect bus, and activates the first bus interface circuit to transmit data from one of the buffers to the first bus in response to the corresponding BUFFER LOADED signal; and
the second control means comprises means for transmitting data from the second adapter module to one of the buffers in the first adapter module over the interconnect bus only when the corresponding BUFFER AVAILABLE signal is asserted, and means for generating a separate BUFFER LOADED signal corresponding to the one buffer when the predetermined amount of data has been transmitted to the one buffer.

8. Apparatus for controlling data transfers between first and second computer system busses over an interconnect bus; the first and second busses each propagating data during repetitive bus cycles respectively controlled by first and second clock signals; the first bus having a cycle time faster than the second bus; and the interconnect bus including a data path having a plurality of data signals, a first control path having a plurality of first control signals related to control of the data signals, and a second control path having a plurality of second control signals not related to control of the data path, the apparatus comprising:
a first interface circuit including means for connection to the first bus;
signal generating means coupled to the first interface circuit for generating a first group of first control signals, each of the first group of first control signals constituting status signal having an indefinite assertion duration, the signal generating means having assertion-only capability with respect to the status signals;
a second interface circuit including means for connection to the second bus;
control means coupled to the first and second interface circuits for controlling data transfers between the first and second busses and for generating a second group of first control signals, each of the second group of first control signals having a finite duration, the control means having assertion and deassertion capability with respect to the second group of first control signals;
synchronizing means coupled to the signal generating means over the interconnect bus for gating the status signals to the control means in accordance with the second clock signal; and
deassertion means coupled to the control means over the interconnect bus for deasserting the status signals in response to the second group of first control signals.

9. Apparatus as recited in claim 8 wherein the signal generating means is operated in response to the first clock signal, and the control means and the synchronizing means are operated in response to the second clock signal.

10. Apparatus as recited in claim 9 wherein the first group of first control signals are asserted asynchronously to the second clock signal and the second group of first control signals are generated asynchronously to the first clock signal.

11. Apparatus as recited in claim 8 wherein the synchronizing means comprises a dual rank synchronizer.

12. Apparatus as recited in claim 11 comprising means for generating a multiphase clock signal from the second clock signal, and wherein the dual-rank synchronizer is controlled by at least two phases of the multiphase clock signal.

13. A method for providing an information path between first and second busses in a computer system, the first and second busses each propagating data during repetitive bus cycles respectively controlled by first and second clock signals, the first bus having a cycle time faster than the second bus, the method comprising:
initiating a transaction which transfers data from the second to the first bus over a first adapter module connected to a second adapter module by an interconnect bus in response to signals received over the second bus, the transactions requiring transmission of a predetermined amount of data from the second adapter module to the first adapter module;
asserting a BUFFER AVAILABLE signal having an indefinite assertion duration from the first adapter module when a buffer in the first adapter module is ready to receive data over the interconnect bus from the second adapter module;
transmitting data from the second adapter module to the first adapter module over the interconnect bus only when the BUFFER AVAILABLE signal is asserted;
generating a BUFFER LOADED signal when the predetermined amount of data has been transmitted to the first adapter module;
deasserting the BUFFER AVAILABLE signal only in response to a BUFFER LOADED signal having a finite assertion duration received over the interconnect bus from the second adapter module; and
activating a first bus interface circuit to transmit data from the buffer to the first bus in response to the BUFFER LOADED signal.

14. Apparatus for controlling data transfers between first and second computer system busses, the first and second busses each propagating data during repetitive bus cycles respectively controlled by first and second clock signals, the first bus having a cycle time faster than the second bus, the apparatus comprising:
an interconnect bus including a data path having a plurality of data signals, a first control path having a plurality of first control signals related to control of the data signals, a first group of the first control signals comprising a plurality of BUFFER AVAILABLE signals each indicating when a buffer is ready to receive data and a second group of the first control signals comprising a plurality of BUFFER LOADED signals each indicating when data has been transmitted to a buffer;

a first interface circuit including means for connection to the first bus;

a plurality of buffers connected to the first interface circuit;

signal generating means coupled to the first interface circuit for generating the first group of first control signals, each of the first group of first control signals constituting status signals having an indefinite assertion duration, the signal generating means having assertion-only capability with respect to the status signals, the signal generating means comprising means for asserting a separate BUFFER AVAILABLE signal when the respective buffer is ready to receive data, for deasserting each BUFFER AVAILABLE signal only in response to a corresponding BUFFER LOADED signal received over the interconnect bus, and for activating the first bus interface circuit to transmit data from one of the buffers to the first bus in response to the corresponding BUFFER LOADED signal;

a second interface circuit including means for connection to the second bus;

control means coupled to the first and second interface circuits for controlling data transfers from the second to the first bus and for generating the second group of first control signals, each of the second group of first control signals having a finite duration, the control means having assertion and deassertion capability with respect to the first control signals and comprising means for transmitting data over the interconnect bus to one of the buffers only when the corresponding BUFFER AVAILABLE signal is asserted, and means for generating a separate BUFFER LOADED signal corresponding to the one buffer when data has been transmitted to the one buffer;

synchronizing means coupled to the signal generating means over the interconnect bus for gating the status signals to the control means in accordance with the second clock signal; and deassertion means coupled to the control means over the interconnect bus for deasserting the status signals in response to the second group of first control signals.

* * * * *